US012283154B2

(12) United States Patent
Schertzer et al.

(10) Patent No.: US 12,283,154 B2
(45) Date of Patent: *Apr. 22, 2025

(54) SECURE PREDETERMINED GAME GENERATION

(71) Applicant: IGT Global Solutions Corporation, Providence, RI (US)

(72) Inventors: Jeffrey Schertzer, Valrico, FL (US); Bruce Coffman, Mulberry, FL (US); Kenneth E. Irwin, Jr., Dawsonville, GA (US); David Knechtges, Davenport, FL (US)

(73) Assignee: IGT GLOBAL SOLUTIONS CORPORATION, Providence, RI (US)

( * ) Notice: Subject to any disclaimer, the term of this patent is extended or adjusted under 35 U.S.C. 154(b) by 95 days.

This patent is subject to a terminal disclaimer.

(21) Appl. No.: 18/313,023

(22) Filed: May 5, 2023

(65) Prior Publication Data

US 2023/0274610 A1 Aug. 31, 2023

Related U.S. Application Data

(60) Division of application No. 18/057,389, filed on Nov. 21, 2022, now Pat. No. 11,694,505, which is a continuation of application No. 17/453,414, filed on Nov. 3, 2021, now Pat. No. 11,514,750.

(60) Provisional application No. 63/192,371, filed on May 24, 2021.

(51) Int. Cl.
*G07F 17/32* (2006.01)

(52) U.S. Cl.
CPC ...... *G07F 17/3227* (2013.01); *G07F 17/3241* (2013.01)

(58) Field of Classification Search
CPC ......................... G07F 17/3227; G07F 17/3241
See application file for complete search history.

(56) References Cited

U.S. PATENT DOCUMENTS 6,588,747 B1 7/2003 Seelig
7,153,206 B2 12/2006 Bennett
7,374,484 B2 5/2008 Bennett
8,267,766 B2 9/2012 Lazar
8,398,484 B2 * 3/2013 Wright .................... G07F 17/42 463/28
10,185,522 B2 1/2019 Irwin et al.
(Continued)

OTHER PUBLICATIONS

"OLG recalling Bingo tickets over security concern", Toronto CTV News, https://toronto.ctvnews.ca/olg-recalling-bingo-tickets-over-security-concern-1.233201, Mar. 14, 2007.
(Continued)

*Primary Examiner* — Kevin Y Kim
(74) *Attorney, Agent, or Firm* — Neal, Gerber & Eisenberg LLP

(57) ABSTRACT

Systems and methods for enabling secure automated production and redemption of predetermined games of chance with multiple play venues or dimensions, wherein such systems and methods can provide, for example, lottery games (e.g., instant tickets), charitable gaming (e.g., raffles, pull-tabs), casino environments (e.g., "Class II" gaming), Internet gaming (e.g., poker, online instant tickets), etc.

6 Claims, 26 Drawing Sheets
(11 of 26 Drawing Sheet(s) Filed in Color)

(56) References Cited

U.S. PATENT DOCUMENTS

| | | | |
|---|---|---|---|
| 2008/0084024 | A1 | 4/2008 | Streeter et al. |
| 2010/0027834 | A1 | 2/2010 | Spitzig et al. |
| 2013/0040728 | A1 | 2/2013 | Tarantino |
| 2014/0222880 | A1 | 8/2014 | Wu et al. |
| 2018/0129844 | A1 | 5/2018 | Rothschild |
| 2018/0345153 | A1 | 12/2018 | Irwin et al. |

OTHER PUBLICATIONS

"Toronto man cracked the code to scratch-lottery tickets", Toronto Star, https://www.thestar.com/news/gta/2011/02/04/toronto_man_cracked_the_code_to_scratchlottery_tickets.html, Feb. 4, 2011.

* cited by examiner

Ship File 127'

Validation File 128'

| Ship File | Validation File |
|---|---|
| 284-000000 | 888781032158-No Win |
| 284-000001 | 683473358290-$2 |
| 284-000002 | 789369458712-No Win |
| 284-000003 | 567559267002-No Win |
| 284-000004 | 123456789012-$2000 |
| 284-000005 | 285586860013-No Win |

⋮

| Ship File | Validation File |
|---|---|
| 284-004870 | 783781458158-No Win |
| 284-004871 | 043473358291-No Win |
| 284-004872 | 669368858714-No Win |
| 284-004873 | 467959267117-No Win |
| 284-004874 | 827394789063-$5 |
| 284-004875 | 696586868523-No Win |
| 284-004876 | 888781032158-$2 |
| 284-004877 | 683473358290-No Win |
| 284-004878 | 646817044023-$2 |
| 284-004879 | 443571599870-No Win |
| 284-004880 | 000789723113-No Win |
| 284-004881 | 097080565951-$10 |
| 284-004882 | 490781032263-No Win |
| 284-004883 | 683473358290-No Win |
| 284-004884 | 789369458712-No Win |
| 284-004885 | 567559267002-No Win |
| 284-004886 | 908765432114-No Win |
| 284-004887 | 285586860013-$2 |
| 284-004888 | 377810321510-No Win |
| 284-004889 | 404456358294-$2 |
| 284-004890 | 369222458799-No Win |
| 284-004891 | 555559267077-No Win |
| 284-004892 | 123498752036-No Win |
| 284-004893 | 784568600302-No Win |
| 284-004894 | 888781032158-No Win |
| 284-004895 | 683473358290-$2 |
| 284-004896 | 000094587883-No Win |
| 284-004897 | 487559267634-No Win |
| 284-004898 | 090873285671-No Win |
| 284-004899 | 285586860013-$2 |
| 284-004900 | 494781032158-$2 |
| 284-004901 | 322565358866-No Win |
| 284-004902 | 458789453300-No Win |
| 284-004903 | 622559267002-No Win |
| 284-004904 | 120561320513-$5 |
| 284-004905 | 111681860456-No Win |
| 284-004906 | 382638686555-No Win |

FIG. 1E
PRIOR ART

220

221

223

226 227 228

| | | |
|---|---|---|
| 35 | $1,000,000 | 6 |
| 34 | $50,000 | 20 |
| 33 | $20,000 | 50 |
| 32 | $2,000 | 750 |
| 31 | $1,000 X 2 | 750 |

222

•
•
•

222

| | | |
|---|---|---|
| 4 | $10 (TRP) | 90,000 |
| 3 | $25 (DBL) | 90,000 |
| 2 | $50 | 90,000 |
| 1 | $25 | 90,000 |
| 0 | $0 | 1,348,315 |

230

- No consecutive string of non-winning tickets will be > 4
- No more than one winner of $200 per book
- The six $1,000,000 prizes will be approximately evenly distributed among the game
- There will be one $100 winner per book
- Consecutive non-winning tickets will not have identical play data
- No four or more matching symbols
- No duplicates of non-winning tickets

224

13 1 9 5 4 8 2

$100 $200 $300 $500

206′

212′

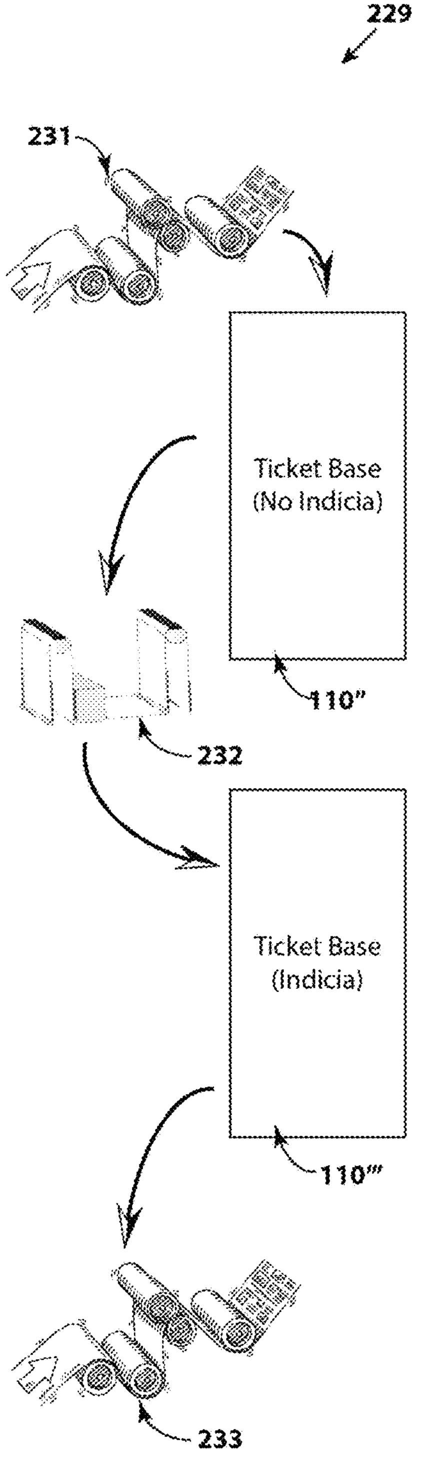

FIG. 2B

FIG. 3G
375
376
$10
JUNEBELLINE
buy 1 get 1
50% off*
with card
Junebelline
Cosmetics
$10
20% OFF
ANY TOTE BAG
BRV
Legal Text
Legal Text
462-00001-1-000
462-00001-1-000

SECURE PREDETERMINED GAME GENERATION

PRIORITY

This application is a divisional of, claims priority to and the benefit of U.S. patent application Ser. No. 18/057,389, filed Nov. 21, 2022, which is a continuation of, claims priority to and the benefit of U.S. Non-Provisional patent application Ser. No. 17/453,414, filed Nov. 3, 2021, now U.S. Pat. No. 11,514,750, issued on Nov. 29, 2022, which claims priority to and the benefit of U.S. Provisional Patent Application No. 63/192,371, filed May 24, 2021, the entire contents of both of which are incorporated herein by reference.

BACKGROUND

The present disclosure relates to a system and method for enabling the secure automated production and redemption of predetermined games of chance.

Lottery scratch-off or instant games have become a time-honored method of raising revenue for state and federal governments the world over. The concept of hiding predetermined winning or losing indicia information under a Scratch-Off-Coating (SOC) or other covering (e.g., tear away tabs) has also been applied to numerous products such as commercial contests, tribal gaming, etc. Literally, tens of billions of variable indicia reveal products are produced every year where Scratch-Off-Coatings (SOCs) or another covering are used to ensure that the product has not been previously used, played, or modified.

"Class II" Instant Ticket Vending Machines (ITVMs) enable games of chance to be played with enhanced entertainment in a slot machine styled cabinet. While "Class III" slot machines typically rely on some form of Random Number Generator (RNG) electronically generating real-time results, ITVMs rely on predetermined instant ticket's or pull-tab's prize awards dispensed at the time of play. Class II ITVMs came into being as a matter of legal necessity. Class II machines are usually employed by state lotteries, tribal gaming reservations, charitable gaming, and "racinos" (i.e., gambling establishments that allow Class II machines at a live horse or dog race track). Often, these institutions are prohibited or restricted by law from operating (Vegas style) Class III slot machines. Thus, Class II ITVMs were created to accommodate gaming licenses for these types of institutions.

Several years ago Internet versions of virtual "instant ticket" games (i.e., not physical instant ticket games) that simulated scratching a ticket on a computer or mobile device became available. Similar to "Class II" ITVMs, virtual "instant ticket" games typically utilize previously determined outcomes to distribute prizes primarily due to legal considerations.

In these various types of games, the outcomes are predetermined by another external mechanism. In some versions, the gaming outcomes are predetermined to comply with the applicable laws (such as laws related to Class II slot machines, or lottery instant tickets). In other versions, the gaming outcomes are predetermined for logistical reasons (e.g., preprinted scratch-off ticket manufacturing and distribution, and for pull-tab packs). In still other versions, the gaming outcomes are predetermined to ensure a static prize fund payout (i.e., the amount and types of prizes paid out will exactly match prize fund specifications, assuming a predefined quantity of game plays are sold).

Traditionally, the predetermined outcomes for all of these types of games are created by a separate Generation or "Gen" system that pseudo-randomly, or more to the point mostly ergodically, assigns prizes (if any) to a predefined total quantity of plays or lottery tickets with each play or lottery ticket typically assigned its own validation and/or inventory control number. For example, lottery instant (scratch-off) tickets typically employ a mostly ergodically prize distribution over essentially a one dimensional space consisting of sequentially numbered instant paper lottery tickets. These outcomes are typically created using essentially similar methodologies known throughout the industry. For example, a run of 24 million lottery tickets that has 120 top prize payouts of $10,000 and a prize fund payout percentage of 55%, can be broken up into 100 pools of 240,000 lottery tickets each. The $10,000 winning lottery tickets will be distributed as evenly as possible among the 100 pools, so there will be at least one top prize in each pool, with 20 pools having two top prizes. The 80 pools without the two top prizes will typically be compensated by offering more low and mid-tier prizes, so that the payout percentage is exactly 55% for each 240,000 lottery ticket pool. Each of these 240,000 lottery ticket pools would be further broken up into books of lottery tickets, typically 100 to 400 lottery tickets per book. Thus, the set of all lottery tickets printed for a given game from serial number "1" to "n" essentially forms a one dimensional line with pseudorandom prize distribution spread along the line in a more-or-less ergodic fashion.

BRIEF SUMMARY

In various embodiments, the present disclosure provides a system for generating predetermined game outcomes including varying arrangements of indicia extracted from a game database of elements. In various such embodiments, the system includes a processor and a memory device that stores a plurality of instructions, that when executed by the processor, cause the processor to access the game database of elements including (i) data representing a plurality of art indicia, and (ii) data representing rules for determining a dispersal of different winning and losing arrangements of predetermined game outcome indica, and receive and use a Genesis Seed to generate an unique order and arrangement of selected predetermined game outcome indicia and related art indicia from the game database of elements. In various such embodiments, the game database of elements and the Genesis Seed enable only one possible arrangement of the selected predetermined game outcomes indicia based on the game database of elements and the Genesis Seed. In various such embodiments, the plurality of instructions, when executed by the processor, cause the selected predetermined game outcome indicia to be saved in non-volatile memory.

In various embodiments, the present disclosure provides a system for generating a plurality of Scratch-Off-Coating (SOC) secured documents that each include substrate, variable indicia selected from a plurality of different variable indicia on the substrate, and an SOC covering the variable indicia on the substrate. In various such embodiments, the system includes a printer, a processor, and a memory device that stores a plurality of instructions, that when executed by the processor, cause the processor to: cause the printed variable indica to be printed on the substrates in pseudo-randomly determined different rotational positions on each substrate where the variable indicia exhibits rotational isotropy, and/or cause the printed variable indica to be printed on the substrates in pseudo-randomly determined different mirrored orientations where the variable indica exhibits mirrored isotropy, such that respective positions and/or orientations of the variable indica on the substrates reduce determination of the variable indicia though pinholes in SOCs covering the variable indica.

In various embodiments, the present disclosure provides a system for encrypting a predetermined game production Genesis Seed, wherein the system includes a processor and a memory device that stores a plurality of instructions, that when executed by the processor, cause the processor to perform a foundation level symmetrical encryption of the predetermined game production Genesis Seed using a symmetrical cryptographic key forming a foundation level ciphertext, and preform at least one subsequent level asymmetrical encryption process of the foundation level ciphertext using a different asymmetrical cryptographic key to create a multilevel encrypted ciphertext of the predetermined game production Genesis Seed encrypted by different encryption keys and processes, such that a resulting multilevel encrypted ciphertext is storable for use in future forensic game reconstruction with the predetermined game production Genesis Seed and the foundation level ciphertext destroyed.

Additional features are described herein, and will be apparent from the following Detailed Description and the figures.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fees.

The foregoing summary, as well as the following detailed description of the present disclosure, will be better understood when read in conjunction with the appended drawings. For the purpose of illustrating example embodiments of the present disclosure, there are shown in the drawings various embodiments. It should be understood, however, that the present disclosure is not limited to the precise arrangements and instrumentalities shown.

FIG. 1E is a magnified view of the ship and validation files of the representative example of FIG. 1D.

FIG. 2B is a block diagram first representative example providing a schematic graphical overview of an one dimensional database of the overall block diagram game Gen system of FIG. 2A.

DETAILED DESCRIPTION

Figure 1A:
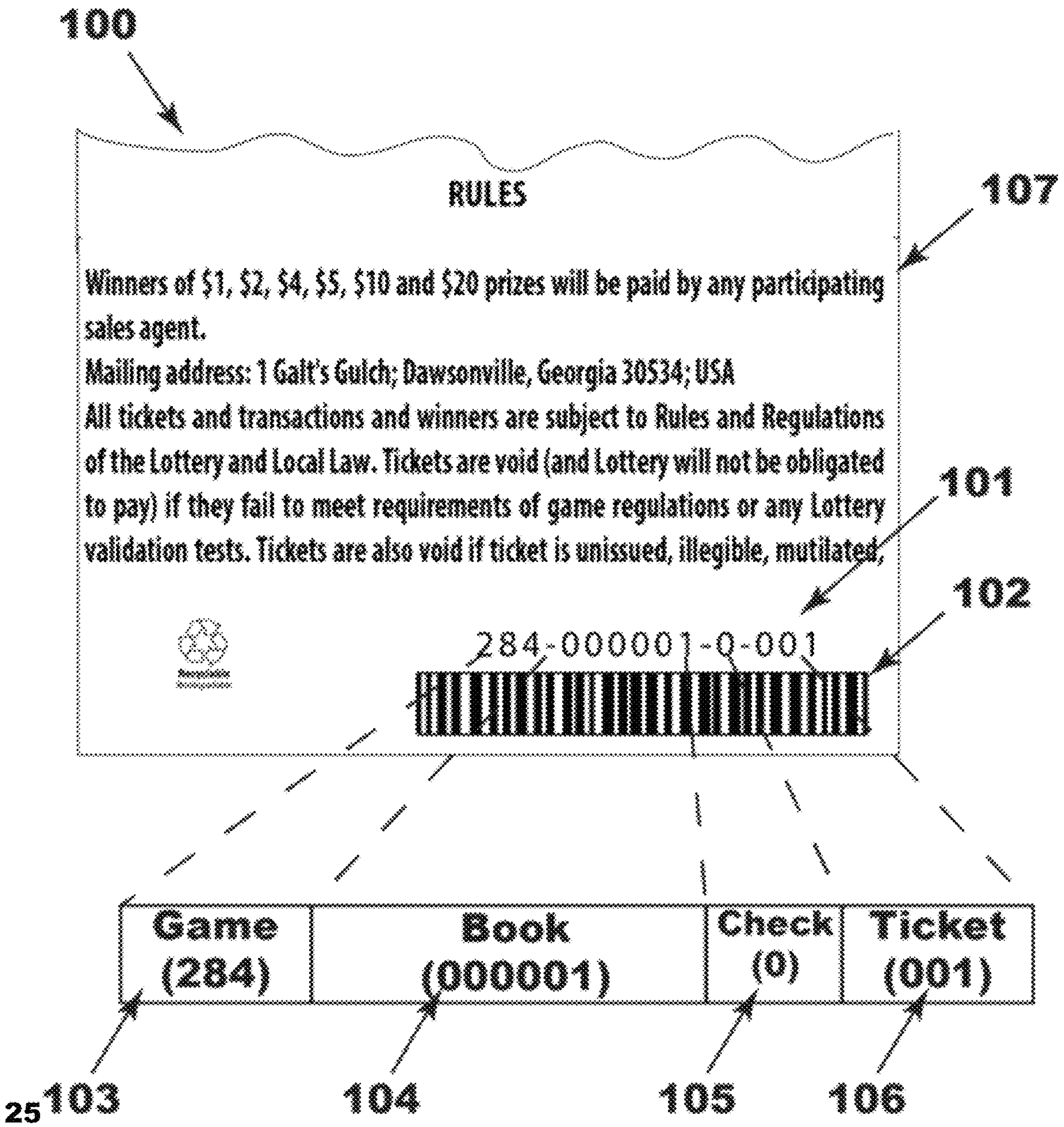
FIG. 1A PRIOR ART
FIG. 1A is a back elevation view of a representative example of part of a known lottery-type instant ticket showing a human readable inventory control number and associated machine readable barcode.

Certain terminology is used herein for convenience only and is not to be taken as a limitation on the present disclosure. The words "a" and "an", include "at least one." The term "book" or "pack" refers to both a unit of shipping and an unit of activation of lottery instant tickets. The terms "user," "player," "purchaser," or "consumer" are also used interchangeably all referring to a human individual utilizing the lottery ticket or other document provided by the present disclosure.

The terms "lottery scratch-off ticket", "commercial contest scratch ticket", "telephone card account number card", "scratch-off gift cards", or simply "scratch-off card" for convenience are all referred to as an "instant ticket" or more simply "ticket" throughout the present disclosure. The term "ticket" can refer to a mechanism to hold a specific wager in escrow until it is known if the wager is a winner or not. In this context, a "ticket" could exist as a physical embodiment (e.g., lottery instant ticket, pull-tab ticket) or as a virtual or digital embodiment (e.g., internal Class II ITVM "ticket" holding player's wager in memory until the next "pull", Internet lottery site game wager).

The terms "image" or "print" are used equivalently and mean that whatever indicium or indicia is or are created directly or indirectly on any substrate can be done by any suitable imaging or printing method or equipment. Likewise, "imaging" or "printing" describes a method and "imaged" or "printed" describing the resulting indicium or indicia are used equivalently and correspondingly to "image" or "print." The terms "full-color" and "process color" are also used interchangeably as terms of convenience for producing a variety of colors by discrete combinations of applications of pigmented primary inks or dyes—e.g., four colors "CMYK" (i.e., Cyan, Magenta, Yellow, and blacK), or in some cases six colors (e.g., Hexachrome printing process uses CMYK inks plus Orange and Green inks), or alternatively eight colors (e.g., CMYK plus lighter shades of cyan or "LC", magenta or "LM", yellow or "LY", and black or "YK").

The terms "multi" or "multiple" or similar terms means at least two, and can also mean three, four, or more, for example, unless otherwise indicated in the context of the use of the terms. The term "variable" indicium or indicia refers to imaged indicia which indicates information relating a property, such as, without limit, a value of the document or video image, for example, a lottery ticket, coupon, digital instant lottery ticket, commercial game piece or the like, where the variable indicium or indicia is or are typically hidden by a SOC or other digital obfuscation medium until the information or value is authorized to be seen, such as by a purchaser of the ticket who scratches off the SOC or other digital obfuscation medium, revealing the variable indicium or indicia. Examples of variable indicium or indicia as a printed or digital embodiment include letters, numbers, icons, or figures.

The term "prize fund" denotes the portion of wagers of a specific game that is anticipated to be paid out in prizes. The term "anticipated" in this context is significant, since in some gaming formats the actual percentage of payout can differ from the anticipated percentage or Estimated Value (EV) theoretically calculated. However, with some gaming formats the anticipated prize fund percentage or EV pays out exactly as anticipated—e.g., instant lottery tickets, Class II ITVMS. The actual funds paid to the winning players at the conclusion of a game are referred to as "Return-To-Player" or more simply "RTP".

The terms "Random Number Generator" or "RNG" are used for brevity to include all forms of random number generation. For example, "True Random Number Generator" or "TRNG," "Pseudo Random Number Generator" or "PRNG" (e.g., Mersenne Twister algorithms, "Linear Congruential Generators" or "LCGs"), etc. could all be referred to as RNGs in this disclosure.

Before describing the present disclosure, it is useful to first provide a brief description of certain of the current state of the art of instant ticket production and validation. This is provided to establish that a common lexicon of existing systems for better understanding of the present disclosure. This description of the various known instant ticket production and validation is provided in the discussions of FIGS. 1A through 1H.

FIG. 1A depicts a representative example of the variable human readable inventory control number 101, associated machine readable barcode 102, and legal text 107 of a known lottery-type instant ticket back 100. As shown in FIG. 1A, the variable printed human readable inventory control number and associated barcode are imaged on the ticket back 100 and therefore accessible (by design) to the retailer prior to purchase of the ticket. Also presented in FIG. 1A is a taxonomy of a typical instant ticket's human readable inventory control number's 101 data: starting with a three or four decimal digit game number 103 identifying the game, followed by a variable length book number 104 (six decimal digits as shown in FIG. 1A), a one or two digit modulo check 105 number, and a variable digit ticket number 106 (three decimal digits as shown in FIG. 1A) uniquely identifying the ticket in a book of lottery tickets. The taxonomy of the instant ticket's barcode 102 data is similar to the human readable 101 inventory control number with the barcode 102 and human readable images embodying identical inventory control data (103 through 106); however, the barcode 102 can embody other data in addition to the human readable inventory control data (103 through 106).

As previously stated, the instant ticket inventory control data (103 through 106) typically found on the back of a lottery ticket 100 are accessible via human readable 101 and barcode 102 to the retailer and others prior to purchase and play of the lottery ticket. This is because, as its name implies, the instant ticket inventory control data (103 through 106) embodied as human readable 101 and machine readable barcode 102 indicia are used for tracking the individual ticket through its life cycle of: production, warehouse storage, shipping, book activation by the retailer, sale, and redemption. Therefore, for security reasons against retailer pick-out, there is no cleartext win or lose information embedded in the instant ticket human readable number 101 or machine readable barcode 102. However, in some versions, win or lose validation information is included in the machine readable barcode 102, but this information is encoded as ciphertext and not accessible in cleartext from an unplayed ticket.

Figure 1B:
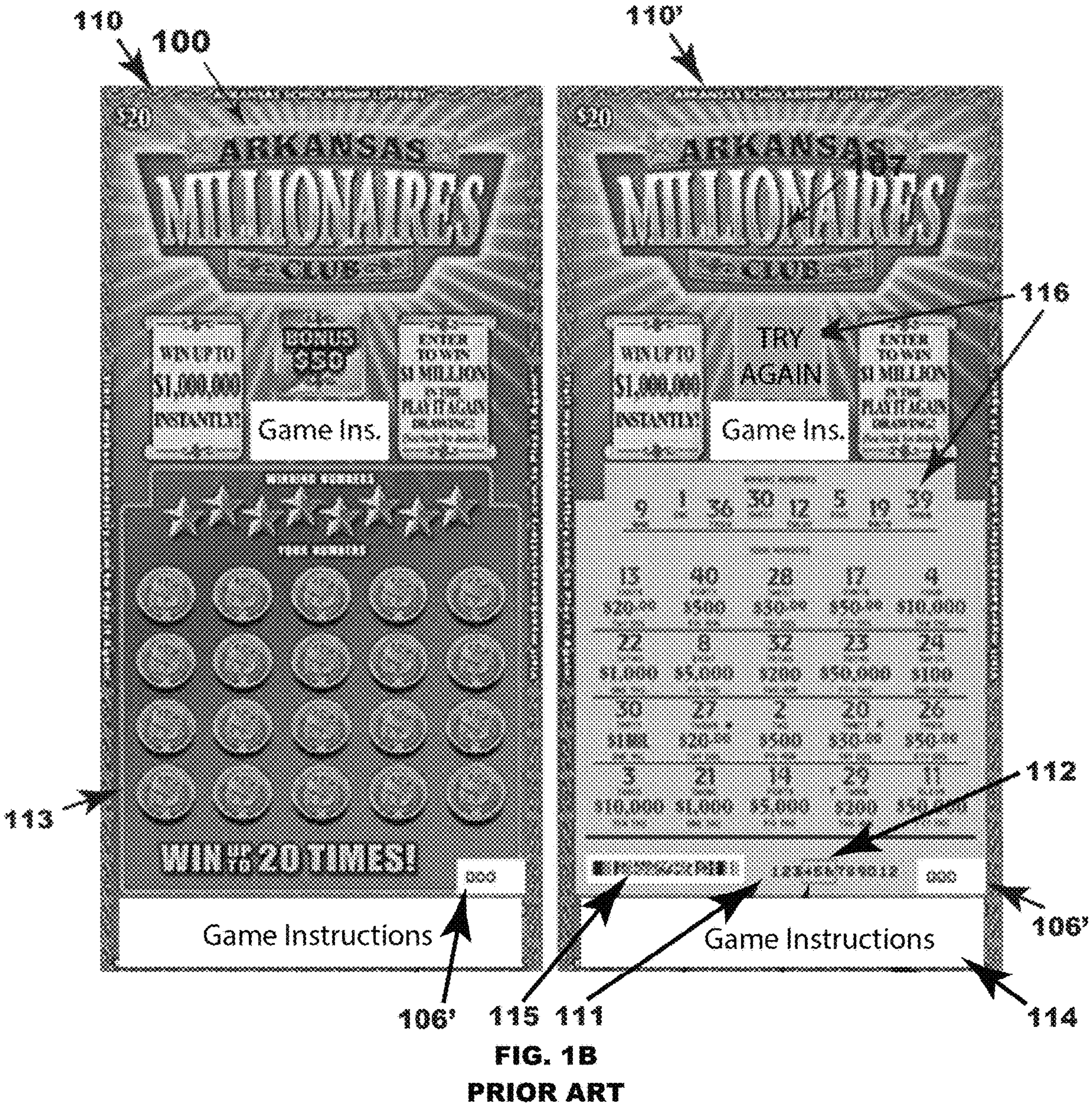
FIG. 1B PRIOR ART
FIG. 1B is a front elevation view of the representative example of a known lottery-type instant ticket of FIG. 1A with views of both variable indicia data secured by a SOC and variable indicia data accessible after the SOC is removed.

FIG. 1B depicts representative examples of front elevation views of an unplayed 110 and a played (i.e., all SOC removed) 110' known instant lottery ticket. As shown in FIG. 1B, the variable validation number 111 is imaged beneath the ticket's SOC 113 and is therefore only accessible after the ticket has been purchased and played. Typically included as part of the validation number 111, are a series of three or four boxed decimal digits 112 that can be used to verify that the lottery ticket has been properly played during validation and redemption. Again, since the validation number 111 and associated or highlighted digits 112 are covered by the SOC of unpurchased lottery tickets, this data is theoretically inaccessible until the lottery ticket is purchased and played. In addition to the validation number 111, human readable game play indicia 116 are also imaged under the SOC, providing the human player with win or lose information. In some versions, a validation barcode 115 is also imaged under the SOC to enable expedited redemption of winning tickets by scanning. As before, this validation barcode 115 is covered by the SOC on unsold lottery tickets thereby preventing it from being scanned until the lottery ticket is purchased and played.

Also typically found on both lottery ticket front views 110 and 110' is the imaged ticket number 106' that should be identical to the ticket number 106 (FIG. 1A) imaged on the ticket back 100. This double back 100 and front (110 and 110' of FIG. 1B) ticket number 106 and 106' imaging is presented to aid the retailer in inventory control as well as provide a quality assurance check during production to ensure that the front and back ticket imagers are in synchronization.

Figure 1C:
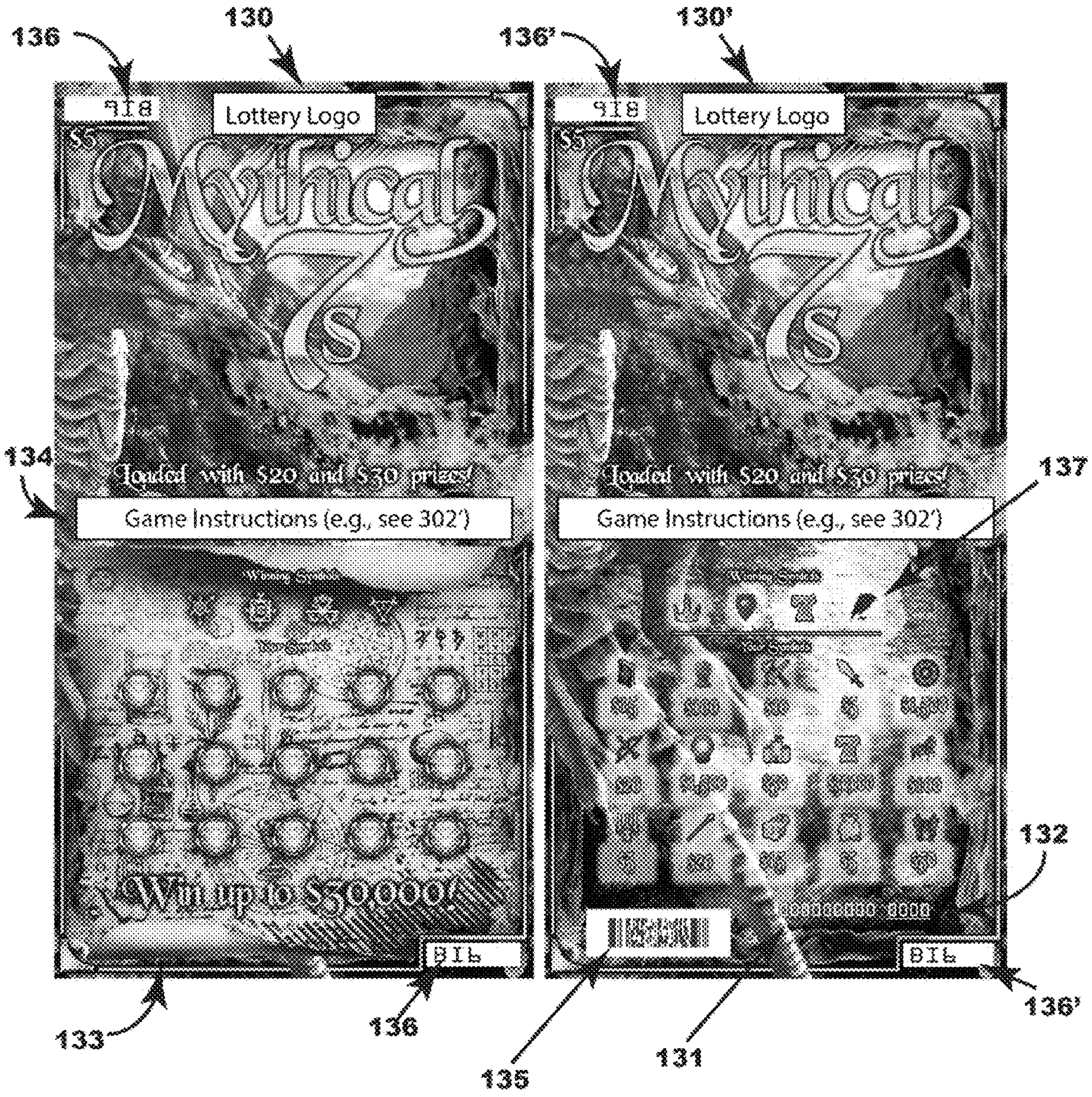
FIG. 1C PRIOR ART
FIG. 1C is a front elevation view of the representative example of a known lottery-type instant ticket of FIG. 1A where both the display and the indicia portions were digitally imaged with views of both variable indicia data secured by a SOC and variable indicia data accessible after the SOC is removed.

FIG. 1C is a representative example of a digitally imaged instant lottery ticket illustrated in both pristine (unplayed) 130 and completely scratched (played) 130' renditions. From a purely functional perspective, the lottery ticket of FIG. 1C is identical to the lottery ticket of FIG. 1B, with FIG. 1C illustrating both pristine 130 (i.e., 133 SOC intact) and completely scratched-off 130' (i.e., variable indicia 137 visible) versions of the instant lottery ticket. Additionally, FIG. 1C also includes ticket numbering 136/136' on the front as well as a validation barcode 135, validation number 131, and highlighted digits 132 under the SOC. Unlike FIG. 1B, with FIG. 1C both the entire front display 134 and all variable indicia 137 are digitally imaged with at least one process color digital imager. However, assuming the same process color digital imager is utilized to print both the display 134 and variable indicia 137, a known one dimensional prize game Gen system would normally be unable to accommodate both coordination of process color variable indicia 137 and display 134.

Figure 1D:
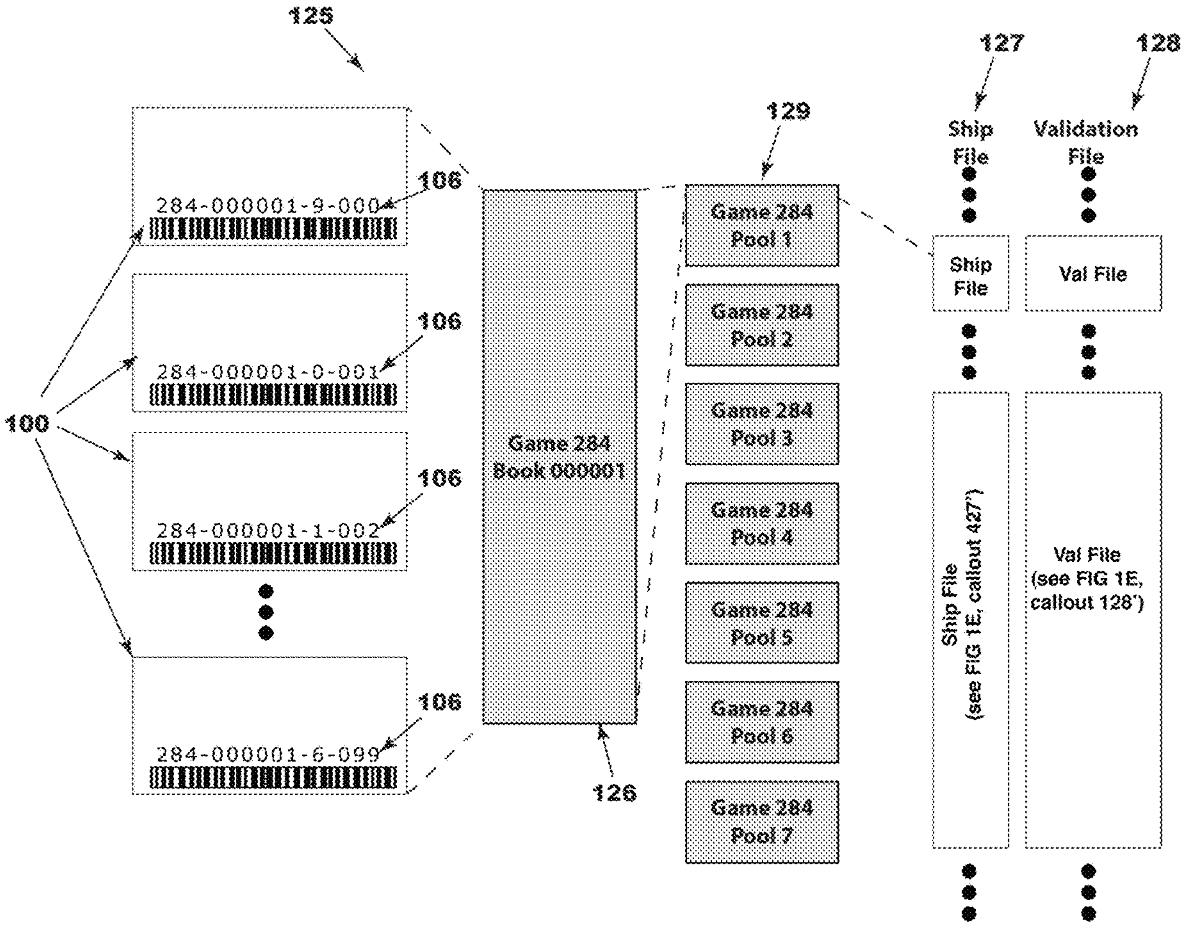
FIG. 1D PRIOR ART
FIG. 1D is a block diagram of a representative example of known lottery-type instant tickets as logistically arranged with respect to the Gen system.

At the system level 125 logistical tracking, activation, and validation of lottery-type instant tickets 100 are accomplished by grouping tickets together in books 126—as indicated in FIG. 1D. The number of tickets per book, one-hundred in this example, (a magnified view of ticket backs 100 in FIG. 1D is provided in FIG. 1A) will vary depending on the game and ticket retail value, but all lottery tickets 100 in a book 126 will have sequential inventory control numbers 101. There are several reasons for arranging lottery-type instant tickets in books, a primary reason being instant tickets are ordered and shipped in books 126 with the book 126 being the fundamental unit of reconciliation. Since instant tickets 100 are shipped in books 126, the book 126 is also the fundamental unit of activation on the overall instant ticket system 125—i.e., there is usually no individual (ticket) level of activation, the finest quantization of activation on a typical instant ticket system 125 is at the book 126 level. Thus, when a retailer receives a new book of tickets 126, the retailer must first activate the book 126 on the system 125 before selling any tickets. Book 126 activation thereby enables instant tickets to be shipped via common carrier since un-activated or stolen books 126 would be automatically flagged on the system 125 with any tickets 100 in the book 126 designated invalid if redemption was attempted.

In addition to shipping, reconciliation, and activation, some games can be structured such that there are a specified minimum quantity and/or types of winners within a book 126. In these versions, the arrangement of winning tickets is not truly random, but are pseudo-randomly distributed within a defined mostly ergodic structure to ensure that most retailers receive approximately the same quantity of low and mid-tier winners per book as well as to aid in ensuring sufficient cash is on hand for paying low and mid-tier prizes.

A given quantity of books 126 are then arranged on the system 125 as a pool 129. The purpose of a pool 129 being to reconcile all low-tier and mid-tier (and possibly high-tier) prizes into a predetermined prize structure. While the size of a pool 129 can vary from game-to-game, in various versions, the pool 129 is sufficiently large to inhibit tracking unsold winning lottery tickets by the public.

All of the produced books 126 for a given game are logged in a digital ship file 127 (magnified view 127' provided in FIG. 1E) by the ticket manufacturer and loaded on the system 125 (FIG. 1D) prior to the game being placed on sale. The ship file contains a listing of all the manufactured books 126 identifying (typically by omission) any book 126 numbers that were destroyed in the manufacturing process. As a game is placed on sale the ship file is routinely expanded with information such as: "book 'X' shipped to retailer 'Y'", "book 'X' activated", "book 'X' stolen", etc. Thus, the ship file enables logistical tracking of all manufactured books 126 in an instant ticket game; however, the ship file 127 does not contain any win or lose information and cannot be linked (without appropriate linked shuffle or mixer seeds) to the validation file 128.

The validation file 128 (magnified view 128' provided in FIG. 1E) contains the validation codes 111 and 131 (FIGS. 1B and 1C, respectively) for all tickets within a game with the validation codes 111 effectively providing pointers to the prize value (if any) of a ticket on the system 125 (FIG. 1D). As previously discussed, the validation codes 111 and 131 (FIGS. 1B and 1C, respectively) are effectively inaccessible on unplayed or unsold tickets due to being covered by SOC 113 and 133 (FIGS. 1B and 1C, respectively). In some versions, the validation code is also embodied as a barcode 115 and 135 (FIGS. 1B and 1C, respectively) hidden under the SOC 113 and 133 such that it cannot be scanned until the ticket is played, and in other versions there is additional validation file 128 (FIG. 1D) information (other than inventory control) in the ticket back barcode 102 (FIG. 1A) in an encrypted format where typically the boxed digits 112 and 132 (FIGS. 1B and 1C, respectively) enable decryption, etc. However, the cleartext validation code 111 and 131 (FIGS. 1B and 1C, respectively) is inaccessible on unplayed or unsold tickets 100 (FIG. 1D). Therefore, the security of the system 125 is derived from the validation file 128/128' being unassociated with the ship file 127/127' as well as the physical unplayed tickets' inventory control information 101 and 102 (FIG. 1A).

Both the ship 127/127' (FIGS. 1D and 1E, respectively) and validation 128/128' files are generated by the instant ticket manufacturer before the tickets are shipped to the lottery. Lottery logistical and validation systems 125 currently require the ship 127/127' and validation 128/128' files to be loaded on the system 125 prior to instant tickets being shipped to retailers and placed on sale. Once loaded onto the system 125, the basic validation 128/128' file typically cannot be altered (other than flagged additions—e.g., redeemed, stolen, etc.) thereby ensuring the integrity of the instant ticket game and its predetermined payout.

Figure 1F:
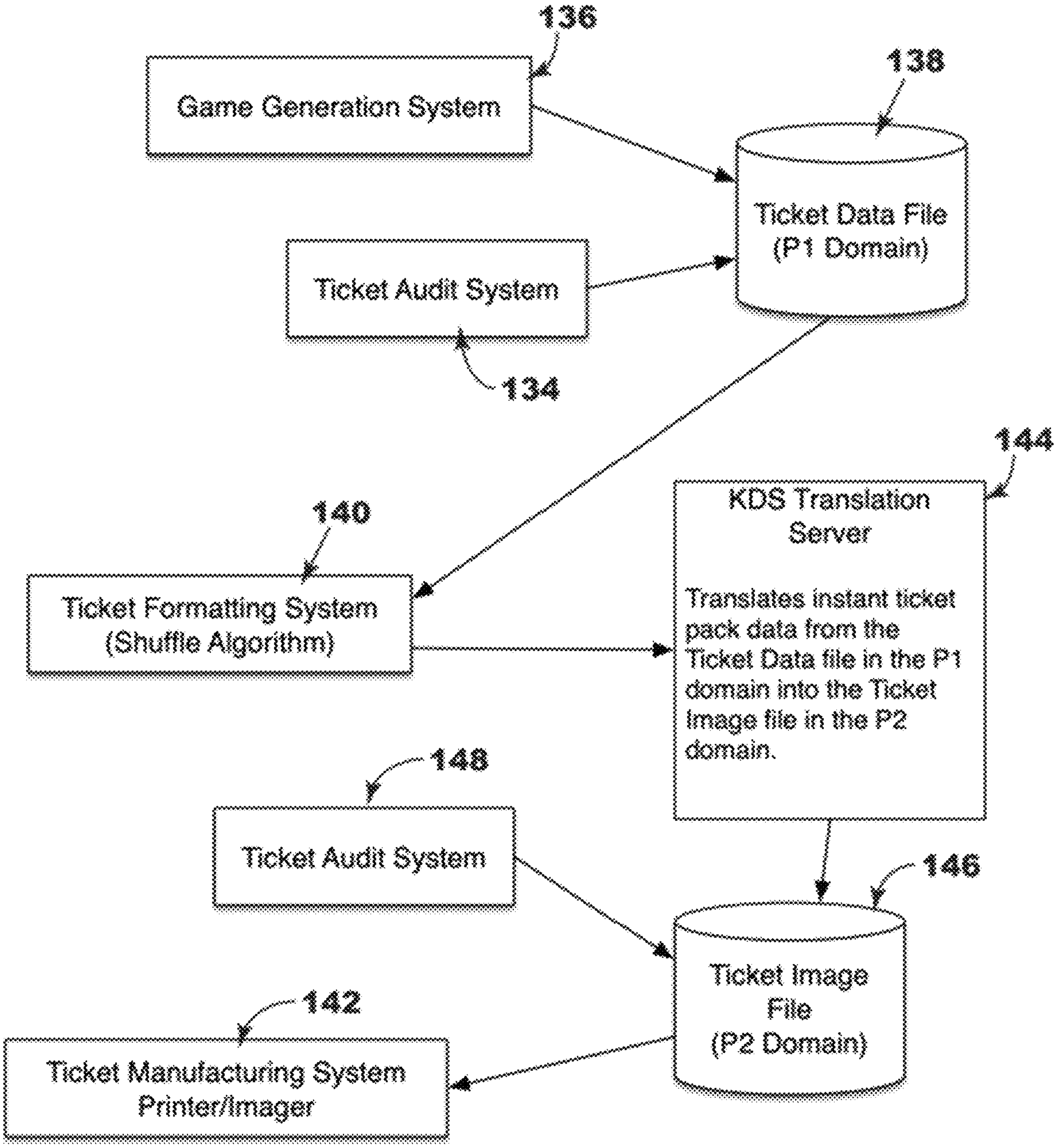
FIG. 1F PRIOR ART
FIG. 1F is an exemplary view of a known block diagram depicting the classic game Gen system.

Thus, with known game Gen systems, the tickets or plays are first arranged in an one dimensional array with the highest tier winning tickets or plays occupying the first positions, the next highest tier winners occupying the next positions, and so on with all of the non-winning tickets or plays appended to the end of the one dimensional array. For example, FIG. 1F illustrates a known game Gen system 136 creating an orderly one dimensional array of all tickets for the instant ticket game 138 that is subsequently audited 134. Thus, the one dimensional array provides an orderly listing of all tickets or plays for the predetermined game. This initial orderly arrangement methodology has been primarily adapted to facilitate auditing—i.e., it is a trivial matter for a human or machine to scan the array and simply count the quantity of each winning tier as well as all losing tickets or plays. Once the audit is completed, a separate shuffle or mixer algorithm 140 typically redistributes the order of the winning and non-winners in a more-or-less ergodic fashion based on a secret numerical seed that is utilized to shuffle or mix 140 the orderly output into a rearranged instant ticket game file 146 used for ticket production 142, including the generation of the ship 127/127' (FIGS. 1D and 1E, respectively) as well as the validation 128/128' files.

In one example, we assume that a lottery organization wants to sell a total of twenty tickets and have a prize fund for the game of 50% with each ticket selling for $1. In this example, the prizes awarded might consist of one $5 winner, one $2 winner, and three $1 winners and can be represented as the orderly one dimensional array: "5, 2, 1, 1, 1, 0, 0, 0, 0, 0, 0, 0, 0, 0, 0, 0, 0, 0, 0, 0." Note that, as previously described, the orderly one dimensional array finite series of win or lose outcomes is a sequential one dimensional array of tickets that is completely deterministic starting with the highest tier winner ($5), decrementing to the next lower tier winner ($2), and so on filling the remaining slot in the finite series with non-winners ($0). The lottery organization does not want to have the first five tickets sold to be winners, so the orderly one dimensional array is shuffled or mixed to achieve a pseudorandomized, generally ergodic, order for the actual printing of the tickets. In this example, the pseudorandomized generally ergodic resulting one dimensional printing sequence might look like the following: "0, 0, 0, 0, 0, 1, 0, 2, 0, 0, 5, 0, 0, 0, 0, 1, 0, 0, 0, 1." As tickets are purchased by consumers, they are removed from the sequence of outcomes. From the above set of outcomes, a consumer purchasing four tickets might buy four losing tickets—"0, 0, 0, 0." If the next player purchased three tickets, the player might receive "0, 1, 0."The next three tickets sold might be "2,0,0." This process continues until the entire sequence of outcomes (twenty in this example) is exhausted.

Returning to FIG. 1F, it can be seen that the known game Gen system 136 creates an orderly one dimensional array of all tickets for the instant ticket game 138 that is subsequently audited 134. Assuming the audit 134 is successful, the orderly one dimensional array of all tickets for the instant ticket game 138 is subsequently shuffled or mixed 140 (with the shuffle or mixer seeds encrypted 144) and the reformatted output (i.e., shuffled or mixed) instant ticket game file 146 undergoing a second audit 148 prior to instant ticket production 142. The shuffle or mixer algorithm can be configured such that there is only one possible arrangement of winning and non-winning tickets or plays for each secret numerical seed with it being extremely difficult and for most practical purposes impossible to determine the secret seed from the final distribution. Accordingly, the security of such a known game Gen system is based on the shuffle or mixer algorithm and the associated secret seed.

Thus, known game Gen systems typically create a one dimensional prize fund distribution array where the predetermined prizes are simply dispersed throughout an instant ticket's print run with each instant ticket designated as a winner or non-winner by its position in the one dimensional array. However, as gaming technology and systems have evolved and become more sophisticated, numerous new types of games and products have emerged that are not possible to produce with the such predetermined one dimensional prize fund distribution arrays.

Those skilled in the art will appreciate the problems associated with production and coordination when a known game Gen system is used to create a one dimensional array where a ticket's winning status is determined by both non-secure portions (i.e., not covered by SOC, visible when the ticket is in an unsold or pristine condition) and secure portions (i.e., covered by a SOC on unsold tickets) of lottery tickets. Partially due to limitations of known one dimensional game Gen systems, these types of coordinated games have in the past proven to be problematic.

For example, in March 2007 the Ontario Lottery and Gaming Corporation (OLG) was forced to recall over a million "Super Bingo" instant lottery tickets after it was announced that a mathematician (named Srivastava) claimed that he could visually tell which lottery tickets were winners by examining the non-secure Bingo card variable indicia readily visible on the front of unsold (pristine) tickets. By conducting an analysis of a collection of played "Super Bingo" lottery tickets, Mr. Srivastava identified a flaw in the known one dimensional game Gen system's algorithm that inadvertently linked the non-secure Bingo card variable indicia with the secure "Super Bingo" call number variable indicia hidden under the SOC on unsold tickets. Mr. Srivastava identified several patterns that were visible on the non-secure variable indicia card portion that would indicate if the lottery ticket was a winner without the need to remove the SOC and expose the secure call number variable indicia.

Figure 1G:
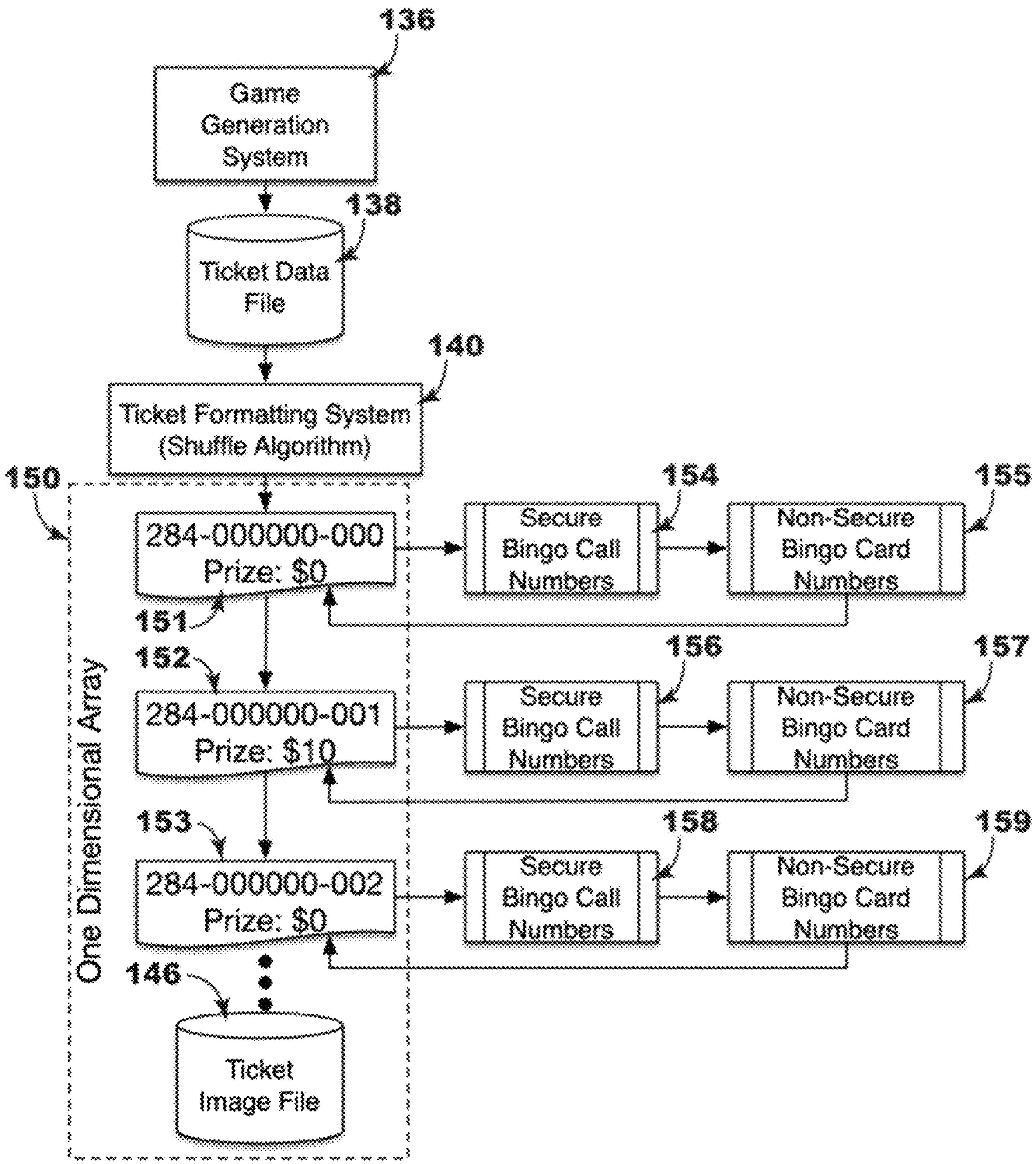
FIG. 1G PRIOR ART
FIG. 1G is an exemplary view of a block diagram depicting the known generation of the Ontario Lottery and Gaming (OLG) Corporation's "Super Bingo" game.

FIG. 1G provides an overview block diagram of a known game Gen system that could have been used to create the one dimensional array 150 for the OLG "Super Bingo" game. As shown in FIG. 1G, the game Gen 136 process produced an orderly one dimensional array of all of the lottery tickets 138 for the "Super Bingo" game that was subsequently shuffled 140 to create the reformatted output production instant ticket image file 146 for printing. To better illustrate the final shuffled one dimensional array, a portion of the array is highlighted 150 displaying hypothetical examples of the first three tickets in the game (151 thru 153).

The first ticket 151 in the one dimensional array is inventory control number "274-000000-000" and is shown not winning a prize. This non-winning result was passed to an external processes that first generated the secure (i.e., covered by SOC) Bingo call numbers 154 and then generated the associated non-secure (i.e., visible in pristine tickets) Bingo card numbers 155. Thus, an external process 155 was employed to essentially provide the second dimension imaging (i.e., generation of the visible Bingo cards 155) that in turn was driven by the selection of the Bingo call numbers, 154 and ultimately the prize value. However, since the first ticket 151 in the one dimensional array 150 does not win a prize the Bingo call numbers 154 and linked Bingo cards 155 variable indicia must be arranged so that no prize award is indicated. The resulting Bingo call numbers 154 and associated Bingo cards 155 variable indicia are then associated with the first ticket 151. This same external processing was used to also produce the Bingo call numbers (156 and 158) and Bingo card numbers (157 and 159) for the next two tickets (152 and 153) in the one dimensional array 150 as well as every other ticket in the ticket image file 146, which contains the one dimensional array in its entirety.

Thus, FIG. 1G illustrates that a known game Gen system was utilized to create a one dimensional array listing the prize values for each ticket with external processes repeated called to provide the additional functionality to create the added non-secure Bingo card numbers 155, essentially providing an added dimension of processing. It was this added dimension of processing that inadvertently created the indications or "tells" that Mr. Srivastava used to pick-out winning tickets in the OLG "Super Bingo" game. The problem arose because the added dimension of processing was not an integral part of the game Gen process, but rather incorporated by the add on external processes that simply received the prize value (if any) for each lottery ticket in the "Super Bingo" game as their only input with no further integration. These external processes then first generated the Bingo call number (154, 156, and 158) variable indicia relaying the generated call numbers to a second Bingo card numbers (155, 157, and 159) process for creation of the non-secure linked Bingo card variable indicia. Since the non-secure linked Bingo card numbers process (155, 157, and 159) received the previously generated Bingo call numbers (154, 156, and 158) and prize value (if any), the Bingo card numbers process algorithm was inadvertently susceptible to creating unexpected correlations that under some circumstances made the Bingo cards appear predictable, at least in the case of Mr. Srivastava's analysis.

In addition to Bingo tickets, there have been previous attempts to coordinate an instant ticket's variable non-secure plate printed display (i.e., front portion of an instant lottery ticket visible prior to sale that is printed by press cylinder plates) and a one dimensional game array creating a two dimensional game format with the second dimension achieved by the synchronization of the printing plates with the variable indicia imaging. Thus, a winning ticket is identified by matching the one dimensional array of secure variable indicia with the second dimensional non-secure plate printed display. This type of two dimensional game play printing technique has also proven to be problematic because it requires that the operator of the drop-on-demand ink jet imager to be cognizant of the orientation of associated inline analog cylinder(s). Not surprisingly, producing two dimensional game play instant lottery tickets requiring coordination between the analog cylinder positions and the drop-on-demand ink jet imager has proven problematic with games being recalled after they were placed on sale. For example, a series of Lotto Quebec's "Ble D'or" instant lottery tickets were recalled in 2011 when it was discovered that synchronization between the non-secure display and the secure variable indicia was lost, resulting in non-winning tickets appearing to be winners and vice versa.

Figure 1H:
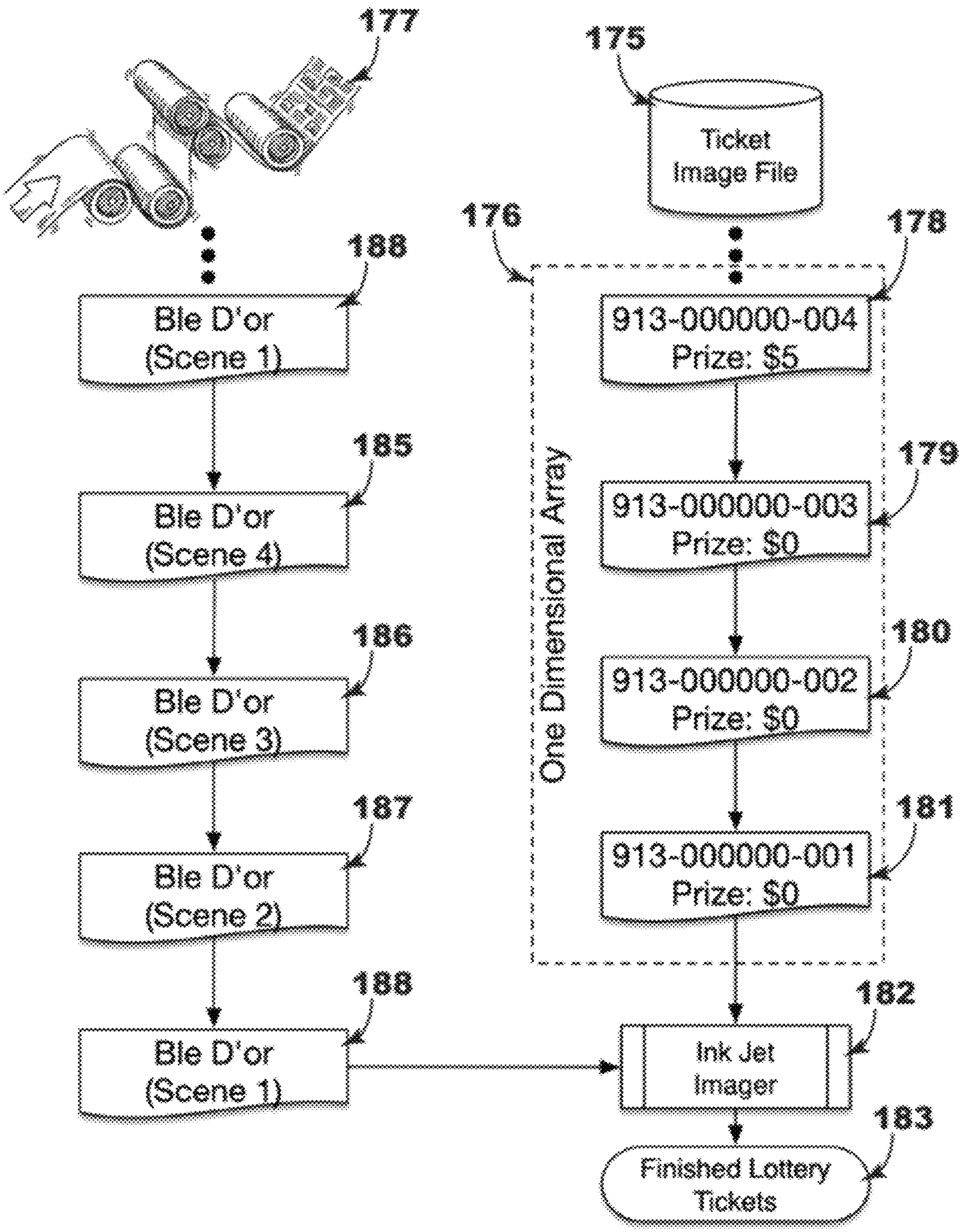
FIG. 1H PRIOR ART
FIG. 1H is an exemplary view of a block diagram depicting the known generation of Lotto Quebec's "Ble D'or" game.

FIG. 1H provides an overview block diagram of a known game Gen system that could have been used to create the one dimensional array 176 for Lotto Quebec's "Ble D'or" game. In FIG. 1H, the game Gen and shuffling processes (not shown in FIG. 1H) produced the output production instant ticket image file 175 for printing all of the tickets of the "Ble D'or" game. To better illustrate the final shuffled one dimensional array, a portion of the array is highlighted 176 displaying hypothetical examples of the first four tickets in the game (178 thru 181).

The first ticket 181 in the one dimensional array with inventory control number "913-000000-001" is shown not winning a prize. The way the "Ble D'or" game was played, this non-winning result was determined by the variable indicia of ticket 181 not matching its corresponding plate printed scene 188 (scene 1 for the first ticket 181). Thus, as the plate printed 177 scene 188 passed under the ink jet imager 182 heads, the variable indicia for the first ticket 181 would be imaged on the first scene 188. This process would continue with the second ticket 180 and scene 187, third ticket 179 and scene 186, and the fourth ticket 178 and scene 185. Since, in this example, the fourth ticket 178 wins a prize ($5), its variable indicia associated with a $5 winner would match scene four 185. However, since the analog plate printed 177 scenes are embodied on a printing cylinder, the scenes would periodically repeat (after four scenes in this example) while the ink jet imager 182 continued to provide non-repeating variable indicia theoretically synchronized with the repeating plate printed scenes on the final ticket product 183.

Thus, the integrity of the "Ble D'or" game was dependent on the synchronization between the plate printed scenes 177 and the ink jet imager 182. So long as the entire print run remained in synchronization between the analog portion 177 and the digital portion 182, the game would be copasetic. Regrettably, in the case of the "Ble D'or" game, a web break (i.e., a separation of the paper substrate threaded through the printing press) caused the printing process to temporarily shut down and, more to the point, restart out of synchronization between the analog plate printed portions 177 and the digitally imaged portions 182 resulting in misprinted tickets. Similar to the previous OLG "Super Bingo" game, the convoluted arrangement of synchronizing analog printed scenes 177 with digitally printed variable indicia 182 on the "Ble D'or" game, in order to provide an added game play dimension to the classic one dimensional prize array produced by known Gen systems, increased the complexity as well as tightly coupled (i.e., if one portion fails the entire system fails) the analog 177 and digital 182 portions together resulting in a system that was disposed to failure.

Consequently, with both the "Super Bingo" and the "Ble D'or" games, the known game Gen system originally configured to produce a predetermined one dimensional array of winning and non-winning tickets per game was rejiggered with supplementary capabilities (i.e., Bingo call numbers and card number generation algorithms initiated by each ticket's value for "Super Bingo" and analog plate images matched to each ticket in the one dimensional array for "Ble D'or") in an attempt to provide needed added functionality. As will now be explained and shown, additional functionality can be better achieved in accordance with the present disclosure by abandoning the classical one dimensional array paradigm in favor of a database centric multidimensional game Gen system.

Reference will now be made in detail to examples of the present disclosure, one or more embodiments of which are illustrated in the figures. Each example is provided by way of explanation of the present disclosure, and not as a limitation of the present disclosure. For instance, features illustrated or described with respect to one embodiment can be used with another embodiment to yield still a further embodiment. It is intended that the present application encompasses these and other modifications and variations as come within the scope and spirit of the present disclosure. As mentioned above, lottery tickets are used herein as an example of the documents of the present disclosure for brevity and are not meant to limit the present disclosure.

The present disclosure provides systems and methods that resolve the problem of securely generating outcomes for predetermined games with multiple play venues or dimensions. Varying embodiments of the systems and methods of the present disclosure can provide, for example, lottery games (e.g., instant lottery tickets), charitable gaming (e.g., raffles or pull-tabs), casino environments (e.g., "Class II" gaming), or Internet gaming (e.g., poker, online instant lottery tickets), etc. One aspect of the various embodiments of the present disclosure is to employ a deterministic generally ergodic machine to generate predetermined games of chance from a previously tested and vetted database thereby enhancing the security, integrity, efficiency, and esthetics of existing predetermined games as well as enabling the creation of new game types that heretofore have not been possible.

Various embodiments of the present disclosure relate to systems and methods for creating and using a multidimensional database centric game Gen system that utilize secure "Genesis Seeds" to generate predetermined games via a one pass deterministic generally ergodic machine using elements from the database. One of the advantages of these embodiments is that only the game database need be retained for reconstructions with no versions (e.g., one dimensional organized array) required to be saved to reconstruct the game in its entirety other than a cleartext version of the creation seed(s) or "Genesis Seed(s)."

In various embodiments, systems and methods are disclosed for enabling a multidimensional database for the game Gen system. The at least two dimensional database facilitates different types of gaming as well as different instant lottery ticket or reveal display construction. For example, the multidimensional game Gen database can include non-game specific elements (such as a ticket front display, and/or a ticket back display) that can be coordinated with the game Gen process such that a limited quantity of books of lottery tickets can be printed for a specified retailer (e.g., a "7-Eleven Cash" lottery ticket game). This is not to imply that the database centric game Gen system is limited to non-gaming applications only. For example, with the multidimensional game Gen database, an instant lottery ticket display front theme can be directly linked to the win/lose variable indicia on each particular lottery ticket without the danger of out-of-synchronization errors between the variable indicia imager and mechanical static plates (such as that which occurred in the Lotto Quebec's "Ble D'or" instant lottery game in 2011). Additionally, the multidimensional database centric game Gen system enables heretofore unknown different types of games to be offered such as a dual game instant lottery ticket that enables a consumer to play a standard scratch-off lottery game as well as a second collectable game in which the accumulation of a specified series of losing lottery tickets enables a second chance probability winning opportunity.

In other embodiments of the present disclosure, systems and methods are disclosed wherein the Genesis Seed(s) that determine the game Gen system's predetermined game outcomes are encrypted (with the cleartext version deleted) n times, corresponding to the n number of parties required to authorize a reconstruction (such as to recreate the predetermined game in order to determine the authenticity of a given lottery ticket or play). In certain such embodiments, the system and method initially symmetrically encrypts the cleartext Genesis Seed(s) for the first level of encryption and then subsequently encrypts the resultant ciphertext n times utilizing asymmetrical public keys from the n number of parties required to authorize a reconstruction.

In other embodiments of the present disclosure, systems and methods are disclosed that support the creation of a blockchain that provides a forensic audit trail of anytime the game database is accessed including the user that accessed the game database as well as the device the user used to access the database. In certain such embodiments, the blockchain also includes a forensic record of anytime the n times encrypted ciphertext Genesis Seed(s) is/are accessed. In various embodiments, the blockchain is sharable among the n number of parties (or others) required to authorize a reconstruction, with any discrepancy in the n number of parties holding copies of the blockchain resolved by utilizing the party that has the longest blockchain of record.

In various such embodiments, a database centric game Gen system using secure Genesis Seeds generates predetermined games. Various embodiments of the present disclosure provide a secure, reliable, and mostly ergodic distribution of prizes for predetermined games of all types.

Other advantages of the present disclosure are set forth in part in the following description, or may be apparent from the present description, or may be learned through practice of the present disclosure. Described are a number of example database centric game Gen mechanisms and methodologies that provide practical details for reliably and securely creating predetermined games. Although the examples provided herein are primarily related to lottery instant tickets (such as SOC removable tickets or pull-tab ticket), it should be clear that the same methods are applicable to any type of predetermined games such as but not limited to Class II ITVMs and Internet games.

Various embodiments of the present disclosure can be implemented as methods, of which examples have been provided. The acts performed as part of the methods can be ordered in any suitable way. Accordingly, embodiments can be constructed in which acts are performed in an order different than illustrated, which can include performing some acts simultaneously, even though such acts are shown as being sequentially performed in illustrative embodiments.

Figure 2A:
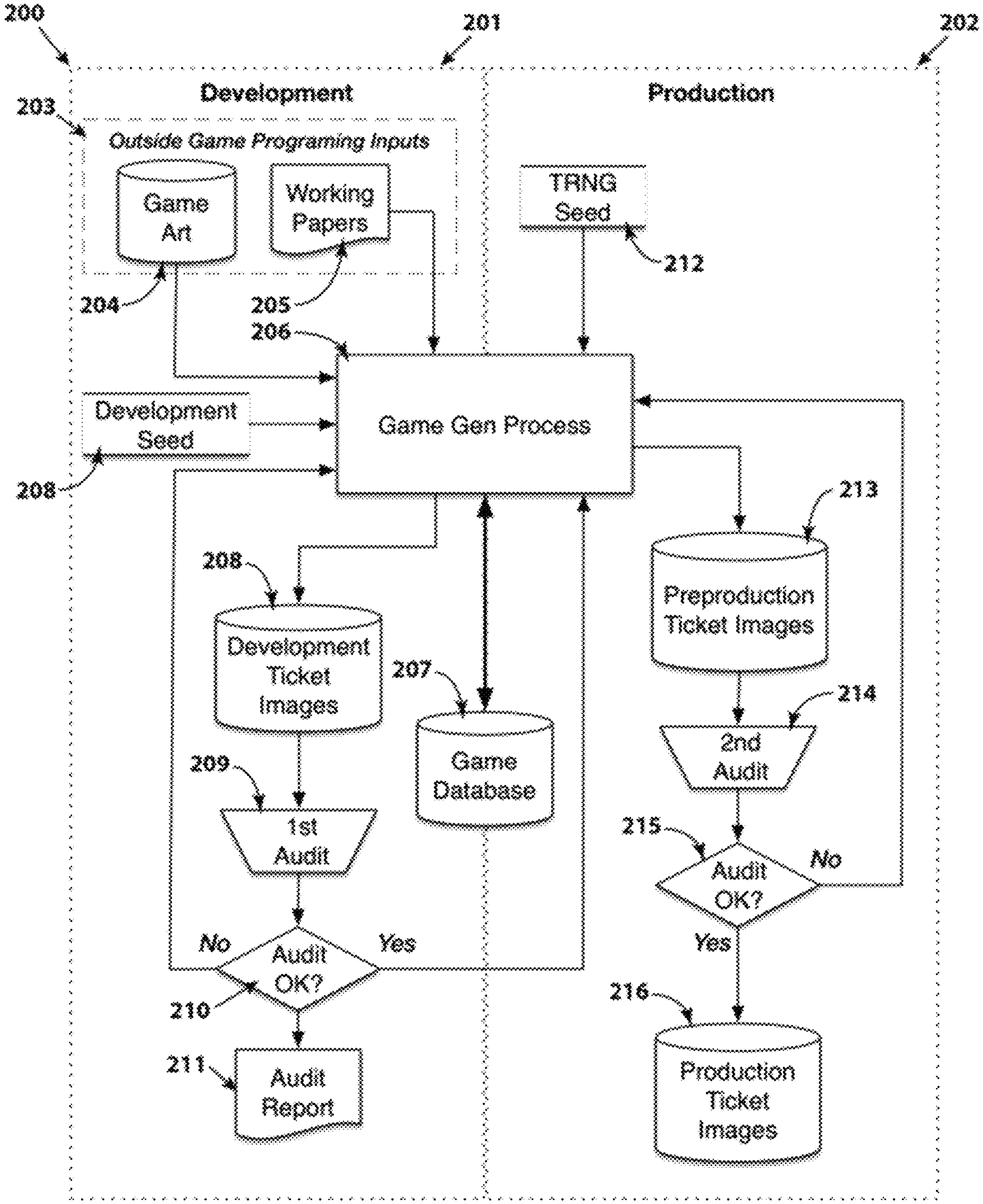
FIG. 2A is an overall block diagram overview representative example of a database centric game Gen system of one example embodiment of the present disclosure.
Figure 2C:
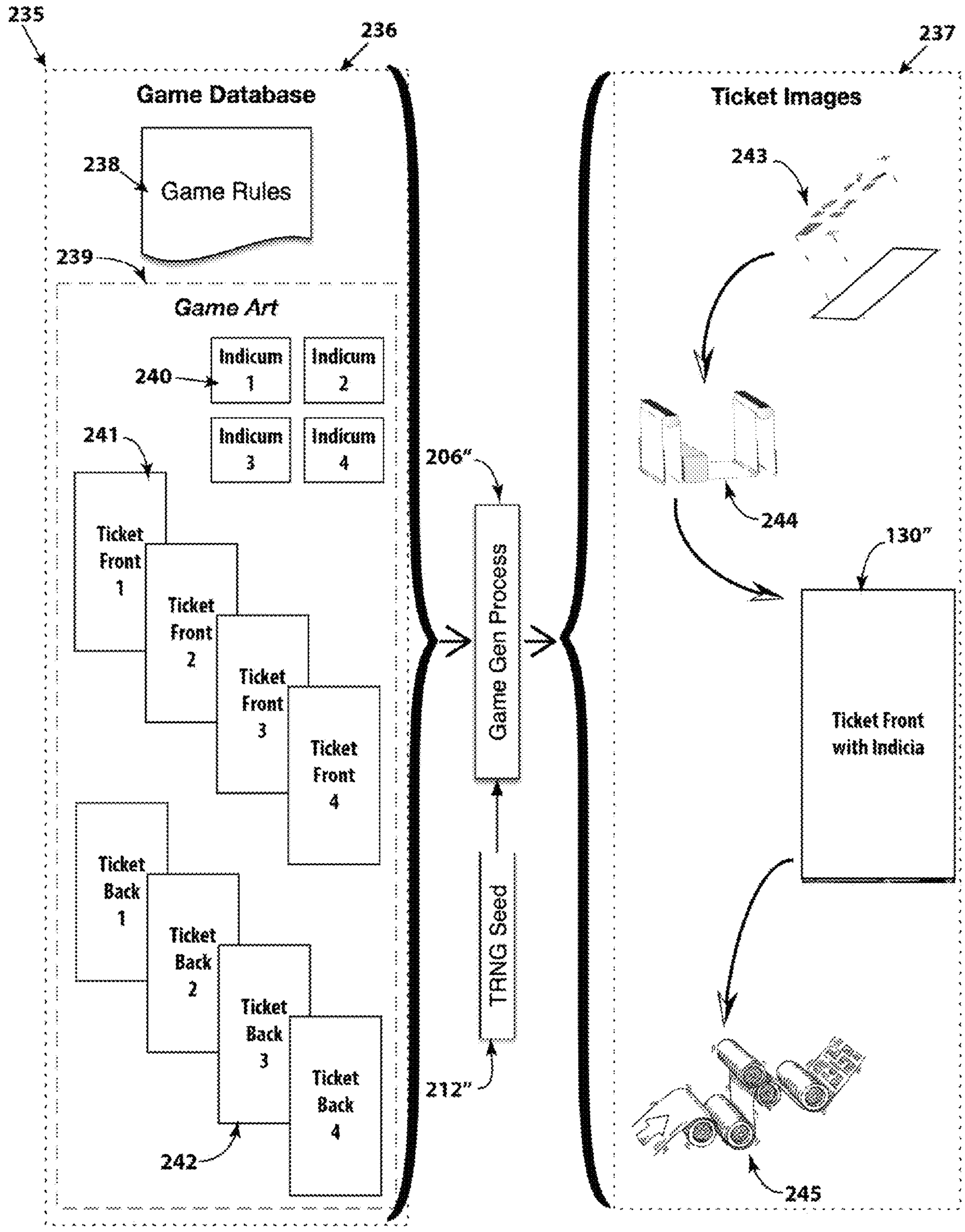
FIG. 2C is a block diagram second representative example providing a schematic graphical overview of a two dimensional database of the overall block diagram game Gen system of FIG. 2A.
Figure 2D:
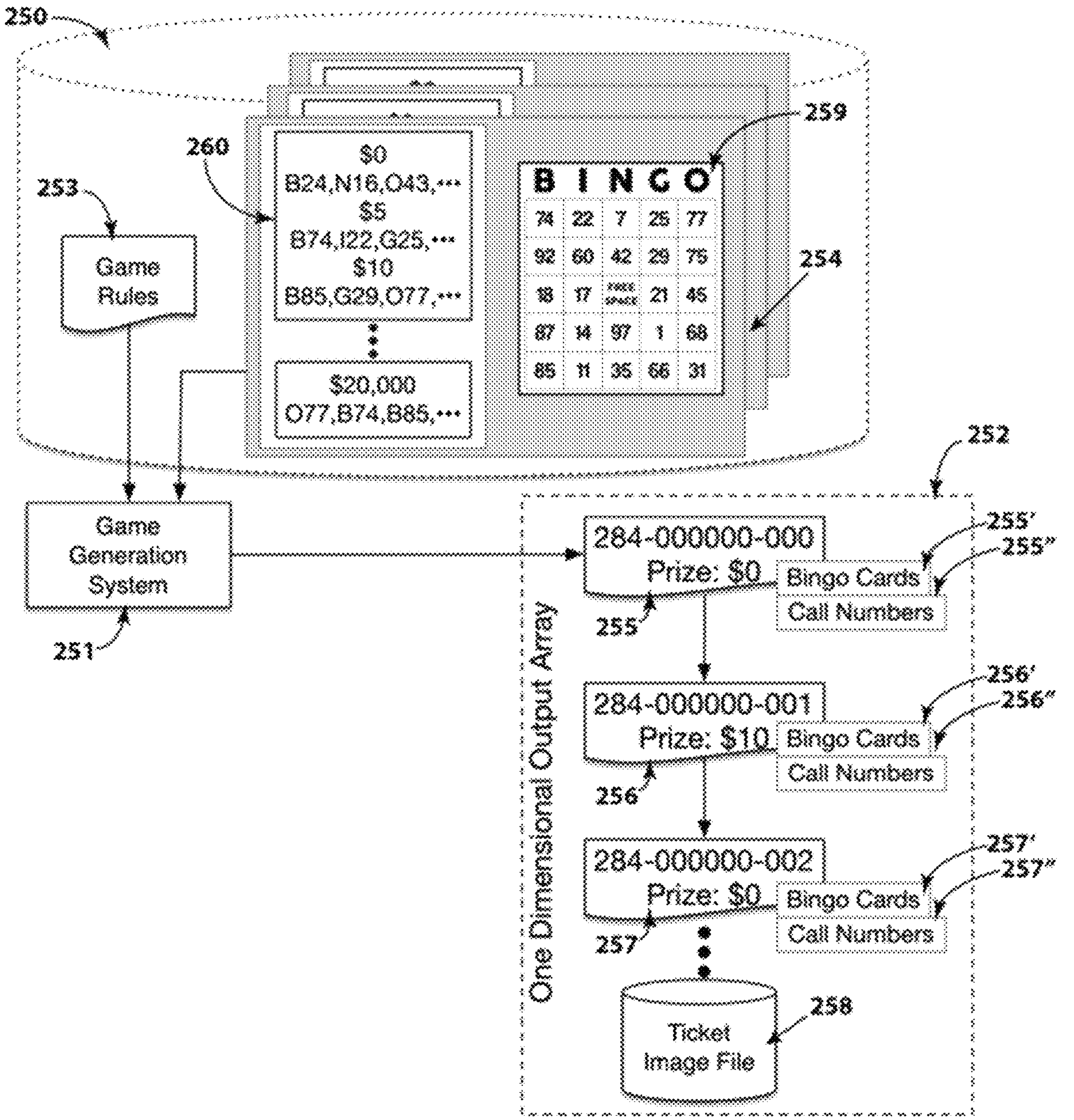
FIG. 2D is a block diagram representative example providing a schematic graphical overview of a two dimensional database of the overall block diagram game Gen system of FIG. 2A configured to replace the known block diagram for the OLG "Super Bingo" game of FIG. 1G.

FIGS. 2A thru 2E taken together, provide detailed specific embodiments of the disclosed database centric game Gen system utilizing secure Genesis Seeds to generate predetermined games via a deterministic generally ergodic process extracting elements from the database. FIG. 2A is an overall block diagram overview representative example of a database centric game Gen system 200. FIG. 2B is a first block diagram representative example providing a schematic graphical overview of the database of the overall block diagram game Gen system of FIG. 2A for generating, traditional style, one dimensional games. FIG. 2C is a second block diagram representative example providing a schematic graphical overview of the database of the overall block diagram game Gen system of FIG. 2A for generating multidimensional games. FIG. 2D is a third block diagram representative example providing a schematic graphical overview of the database of the overall block diagram game Gen system of FIG. 2A for generating the above described game of OLG Corporation's "Super Bingo" game of FIG.

Figure 2E:
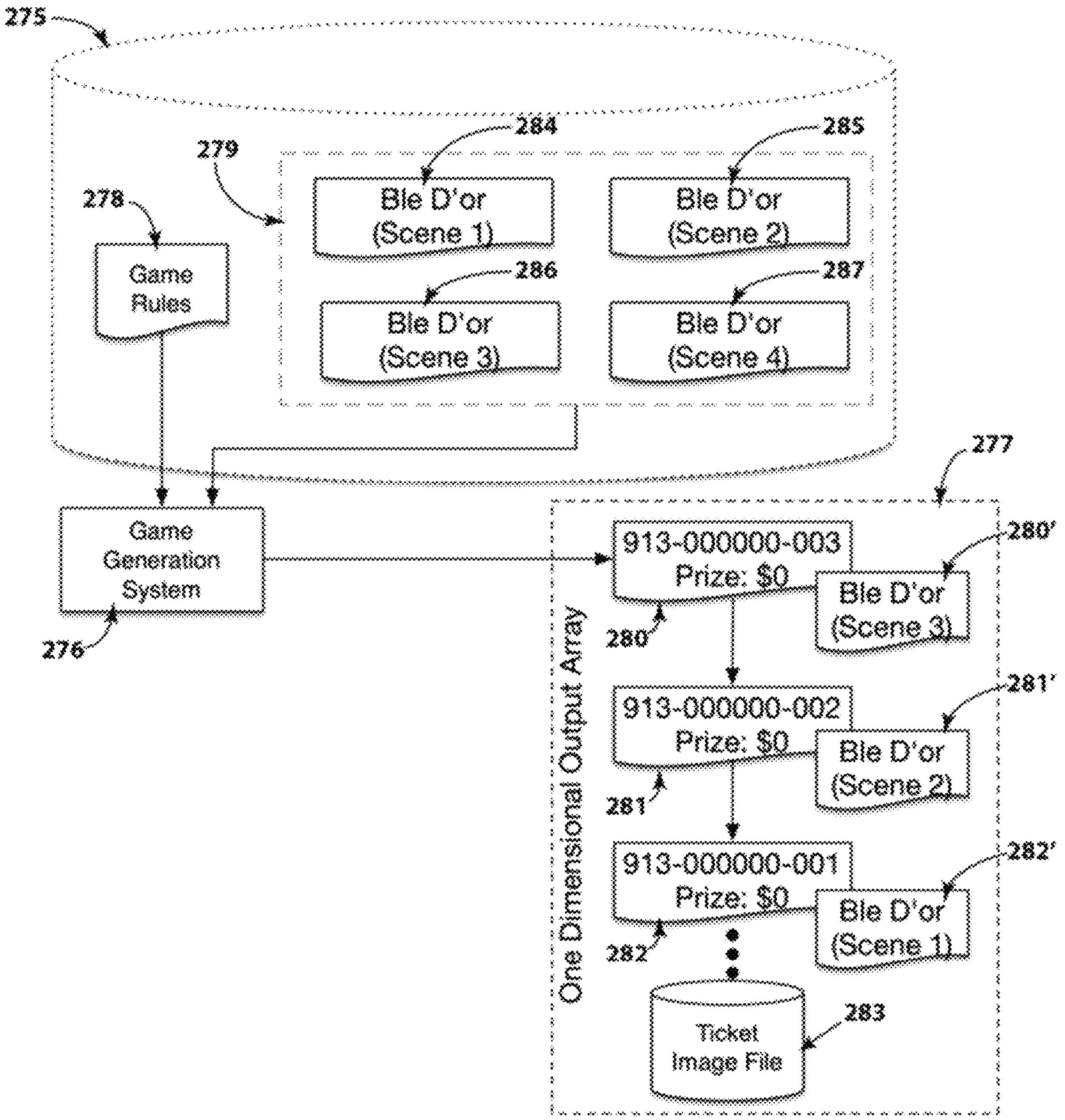
FIG. 2E is a block diagram representative example providing a schematic graphical overview of a two dimensional database of the overall block diagram game Gen system of FIG. 2A configured to replace the known block diagram for Lotto Quebec's "Ble D'or" game of FIG. 1H.

1G in a new secure manner. Finally, FIG. 2E is a fourth block diagram representative example providing a schematic graphical overview of the database of the overall block diagram game Gen system of FIG. 2A for generating a game like Lotto Quebec's "Ble D'or" game of FIG. 1H in a new reliable manner.

The exemplary system 200 of FIG. 2A is conceptually divided into two processes (i.e., "Development" 201, "and "Production" 202) by the two columns as shown in FIG. 2A. The exemplary database graphical overviews 220 and 235 of FIGS. 2B and 2C are also conceptually divided into two processes (i.e., "Game Database" 221/226 and "Ticket Images" 222/237, respectively) by the two columns as shown in FIGS. 2B and 2C. If a particular flowchart function appears completely within a column, its functionality is limited to the data category of the associated column—e.g., in FIG. 2A the Working Papers 205 functionality is exclusively part of the Development process 201. If a particular flowchart function appears bordering the two columns (e.g., Game Database 207), its functionality is shared between the data categories of the two columns.

The disclosed specific embodiment 200 of FIG. 2A begins with outside entities 203 providing the Game Art elements 204 as well as the Working Papers specification 205 for a predetermined game to the Game Gen Process 206, which processes the Game Art 204 and rules extracted from the Working Papers 205 ultimately saving the processed elements in the Game Database 207. Thus, in this example embodiment, a new Game Database 207 is created for every predetermined game to be produced by the database centric Gen system 200.

After all game elements have been saved into the specific Game Database 207 for the pending game, a Development Seed 208 (that can be used only for development and testing purposes, and saved as cleartext and not secured) functions as a test Genesis Seed for this particular Game Database 207 allowing the Game Gen Process 206 to construct a test game from the Game Database 207 elements. In this example, the Game Gen Process 206 provides a deterministic machine algorithm in which there is only one possible (ergodic) arrangement of the given Game Database 207 elements for the game being produced that is driven or determined by the Genesis Seed (e.g., Development Seed 208).

The test game output is then saved as a test Development Ticket Images file 208. By saving the test output in the test Development Ticket Images file 208, it then becomes possible to conduct an Audit 209 of the test generated game to confirm that it is within the parameters specified by the Working Papers 205. Since the first Audit 209 is being conducted on a test game output rather than a known linear one dimensional array, it can be argued that the first Audit 209 is more difficult because the Audit 209 is being conducted on a test game output (i.e., pseudorandomized in an approximate ergodic fashion) rather than an orderly one dimensional array. While this is technically true, it should also be noted that modern computing processing power greatly alleviates the classic difficulties of Auditing 209 a simulated game output where the winning and losing tickets are not necessarily arranged in an orderly fashion. More to the point, the first Audit 209 allows for the dispersal of prizes and losing tickets throughout the game to be evaluated.

Returning to FIG. 2A, if the first Audit 209 is successful (i.e., within the parameters specified by the Working Papers 205), then the process will advance to game generation 210. Otherwise, the process will abort 210 with the Game Gen Process 206 reinitiating with possible modified specification elements in the Game Database 207 or other modified criteria. Regardless of the outcome (i.e., acceptable Audit 210 or not), the test game output summary is documented in an Audit Report 211 in this example embodiment.

Assuming the Audit 210 was successful, the Game Gen Process 206 is notified to proceed with the Production 202 of the actual predetermined game that will be put on sale to the general public. In this embodiment, the Production 202 portion is virtually identical to the Development 201 portion, utilizing the same Game Gen Process 206 and Game Database 207. The only difference between Development 201 and Production 202 is the Genesis Seed used to drive the shared Game Gen Process 206 and Game Database 207. In the Development 201 process, a non-secure Development Seed 208 drives the Game Gen Process 206, thereby controlling which elements from the Game Database 207 are acquired for each ticket or play in the game. Since the resultant Development Ticket Images 208 are only used for testing and do not provide any indication of the winning and losing variable indicia in the actual Production Ticket Images 216, there is no need to secure the Development Seed 208 and in various embodiments the Development Seed 208 is saved (e.g., in cleartext) for forensic audit purposes, thereby alleviating the need to save the (relatively large) Development Ticket Images file 208.

However, with the Production 102 portion, the resultant Production Ticket Images 216 arrangement of variable indicia represent payable on demand documents or products for some portion of the tickets or plays to be generated. Therefore, to preserve the integrity of the game, in various embodiments, both the Preproduction Ticket Images file 213 and Production Ticket Images file 216 can be saved as ciphertext. Additionally, in various embodiments, the Production 202 Genesis Seed should be unpredictable, unguessable (e.g., 64 bits, such as 128 or 256 bits), and in various embodiments pseudo-random or truly random. Furthermore, in various embodiments, any Production 202 Genesis Seed is only saved in non-volatile memory as ciphertext after it was generated and successfully input into the Game Gen Process 206—the cleartext embodiment of the Genesis Seed being immediately destroyed without saving it to non-volatile memory.

In various embodiments, Production 202 Genesis Seeds are created by a hardware True Random Number Generator (TRNG) 212. Unlike software RNGs (e.g., Linear Congruential Generator or "LCG", Mersenne Twister), a hardware TRNG 212 generates true random numbers from a physical process, rather than by way of an algorithm—e.g., thermal noise, photoelectric effect, radioactive decay, quantum noise from a tunnel diode. For example, the Thales "SafeNet Luna Network HSM" (Hardware Security Module) built-in hardware TRNG is an acceptable Genesis Seed source for database centric game Gen 200 Production 202 purposes. The same TRNG 212 can also be used as a Genesis Seed source for the Development Seed 208, but is not required in various embodiments due to the lesser security requirements of the test Development 201 environment.

In various embodiments, every Production 202 Genesis Seed received from the TRNG 212 is digitally signed by the TRNG 212 and verified by the Game Gen Process 206 using the TRNG's 212 public key prior to being utilized for production. As previously discussed, the Game Gen Process 206 incorporates a deterministic machine algorithm in which there is only one possible (approximately ergodic) arrangement of the given Game Database 207 elements for the produced Preproduction Ticket Images 213 game determined by the Genesis Seed, in various embodiments, provided by the TRNG 212.

Once the Genesis Seed is successfully received by the Game Gen Process 206 from the TRNG 212, the Game Gen Process' 206 deterministic machine produces an unique and unpredictable ergodic distribution of variable indicia extracted from the Game Database 207 constituting the predetermined game in its entirety, and in various embodiments saved as encrypted ciphertext, in the Preproduction Ticket Images database 213. A second Audit 214 is then conducted on the Preproduction Ticket Images database 213 that is similar in terms of functionality to the first Audit 209 performed in the Development process 201. If the second Production 202 Audit 214 is successful 215, the Preproduction Ticket Images database 213 becomes the Production Ticket Images database 216 and transferred in a ciphertext embodiment to the production environment. Otherwise, if the second Production 202 Audit 214 fails 215, the procedure will abort 215 with the Game Gen Process 206 repeating with possible modified specification elements in the Game Database 207 or possibly a new Genesis Seed received from the TRNG 212.

In various embodiments, while the previous database centric Gen system 200 description focused on the production of instant lottery tickets, the same system can be employed for other forms of predetermined games. For example, the database centric Gen system 200 embodiment can also be utilized for the generation of predetermined pull-tab games, Class II ITVM games, Internet gaming, etc.

FIGS. 2B and 2C taken together, provide alternative embodiments of the disclosed game Gen system 200 with differing Game Database 207 configurations. FIG. 2B illustrates an exemplary embodiment 220 of an one dimensional Game Database 221 configuration suitable for generating instant lottery ticket games (e.g., 110 and 110' of FIG. 1C) where only the game play variable indicia are produced by the game Gen system 200 (FIG. 2A). FIG. 2C shows a second exemplary embodiment 235 of a multidimensional Game Database 236 suitable for generating both simple and more complex (e.g., 136 and 136' of FIG. 1C, 300 and 301 of FIG. 3A, 310 and 310' of FIG. 3B, 330 and 330' of FIG. 3C) instant lottery ticket designs where the entire ticket's surface is digitally imaged from images embedded into the Production Ticket Images file 216 (FIG. 2A).

Starting with the traditional one dimensional exemplary embodiment 220 of FIG. 2B, the Game Database 221 is divided into Game Rules 223 and Game Art 224 portions. In this example, the Game Rules 223 portion is further subdivided into a prize table 222 portion and a rules 230 portion.

The prize table portion 222 is organized by sequential prize level 226 tied to the associated prize amount 227 and the number of tickets or plays 228 for the given prize level created in the entire game—e.g., for prize level "35" ($1,000,000 winner) there will be six tickets or plays in the entire game with the non-winning prize level "0" having 1,348,315 tickets of plays in the game. Thus, the predetermined outcomes of the total number of tickets or plays in the entire game (database) are specified by the prize table portion 222. Additionally, in this example, the prize table portion 222 also specifies for the winning prizes how those prizes are won—e.g., (a) prize level "31" is associated with a winning prize of "$1,000×2" or a two thousand winner with two winning "$1,000" indicum displayed on the ticket or play, (b) prize level "4" is associated with a winning prize of "$10 (TRP)" or a thirty dollar winner with a tripled "$10" indicum displayed on the ticket or play, and (c) prize level "3" is associated with a winning prize of "$25 (DBL)" or a fifty dollar winner with a doubled "$25" indicum displayed on the ticket or play. The rules 230 portion includes a series of rules or instructions that determine the ergodic distribution of winning and non-winning tickets or plays in the predetermined game. The listings in FIG. 2B of the prize table portion 222 and the rules 230 portion are for human readable illustrative purposes and should not be construed as representing the actual Game Database 221 data structure.

The Game Art 224 portion of the Game Database 221 includes the variable indicia elements that will be individually selected by the Game Gen Process 206' for placement in each predetermined ticket or play. As shown in FIG. 2B, in this particular example, the variable indicia are further subdivided into win or lose matching indicum (e.g., "13", "1", "9") and monetary caption indicum (e.g., "$100", "$200").

Thus, for a one dimensional predetermined game (e.g., 110 and 110' of FIG. 1C), the Game Database 211 (FIG. 2B) primarily contains two different groupings of elements (i.e., Game Rules 223 and Game Art 224). This type of Game Database 211 structure is referred to as "one dimensional" in the present disclosure because with this type of Game Database 211 structure, the Gen system's 220 output is essentially a pseudorandomized typically ergodic one dimensional ticket or play sequence (e.g., "$0, $0, $0, $0, $0, $1, $0, $2, $0, $0, $5, $0, $0, $0, $0, $1, $0, $0, $0, $1 . . . ") where the variable indicia elements are configured to winning or non-winning arrangements for each subsequent sequential position on a finite theoretical line in which the first position is the first ticket or play of the game with the last position on the theoretical line being the last ticket or play of the game. As will be explained below, recent technological developments (e.g., process color imagers capable of imaging an entire lottery instant ticket, Internet games) have enabled new types of ticket and play designs that require multidimensional game database structures to be maintained by the game Gen system.

Returning to the exemplary embodiment 220 of FIG. 2B, the one dimensional Game Database 221 is then accessed by the deterministic Game Gen Process 206' where the variable indica elements copied from the Game Art 224 portion are configured in winning and non-winning arrangements for each sequential ticket or play depending on the data in the Game Rules 223 portion as well as the Genesis Seed received from the TRNG generator 212'. With known one dimensional lottery instant tickets (e.g., 110 and 110' of FIG. 1B) where only the game play variable indicia are configured by the game Gen system 220 (FIG. 2B), the display portion 110" of the lottery instant ticket is typically printed by static printing plates (e.g., flexographic) 231 with the configured variable indicia 110'" printed separately by typically monochromatic imager(s) 232 and the printed variable indicia subsequently covered with various SOC layers applied by an additional set of static printing plates 233. As previously described each printed lottery instant ticket is also assigned its own unique inventory control number embodied in both human readable 101 (FIG. 1A) and machine readable 102 formats thereby listing each lottery instant ticket's place on a finite theoretical line associated with the game.

Figure 3A:
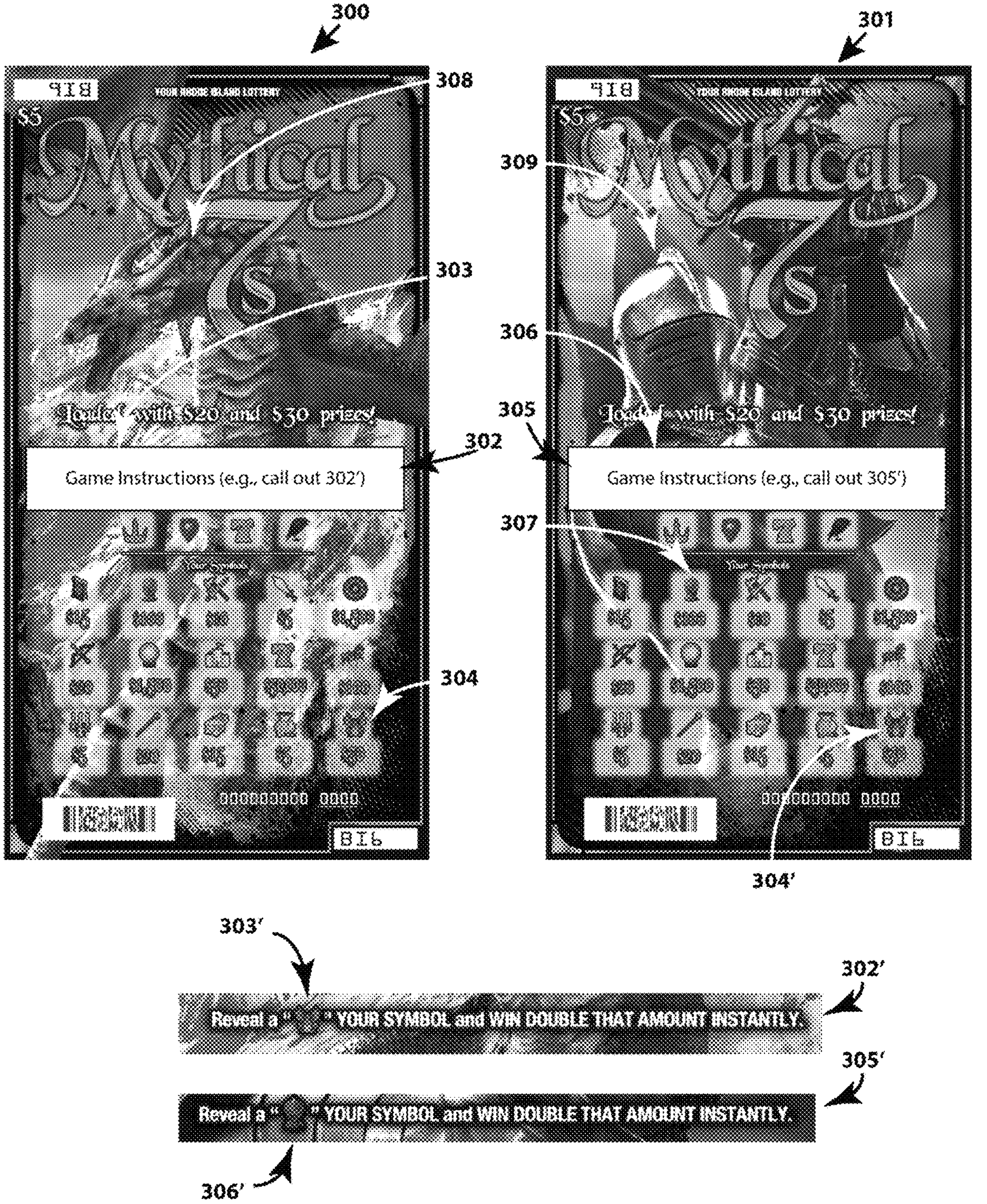
FIG. 3A is a front elevation view of two representative examples of lottery-type instant tickets of the present disclosure where both the display and the indicia portions were digitally imaged by a high resolution process color digital imager with the display portion synchronized to the variable indicia.
Figure 3B:
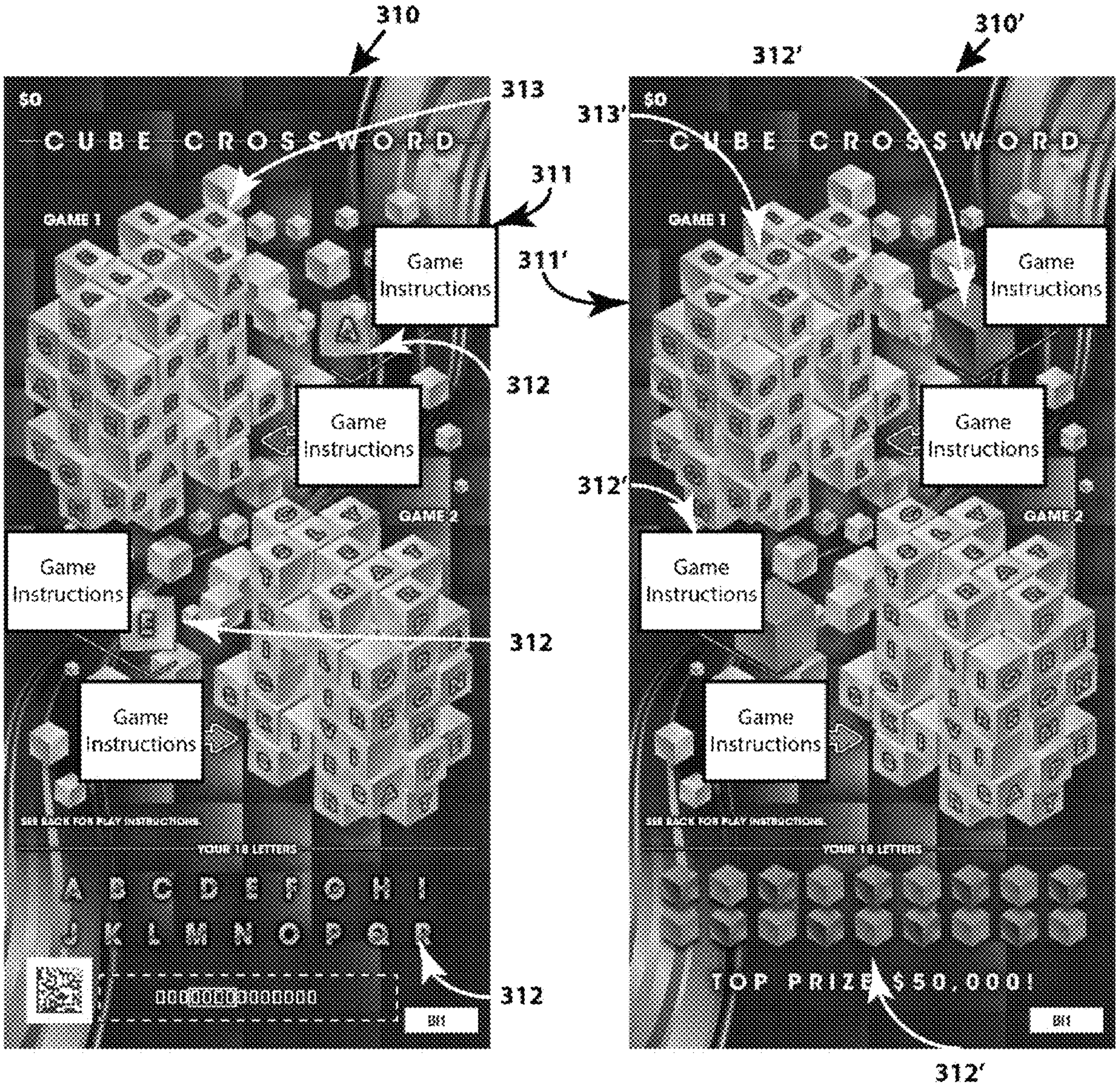
FIG. 3B is a front elevation view of an alternative representative example of a lottery-type instant ticket of the present disclosure where both the display and the indicia portions were digitally imaged by a high resolution process color digital imager with views of both variable indicia data secured by a SOC and variable indicia data accessible after the SOC is removed.
Figure 3C:
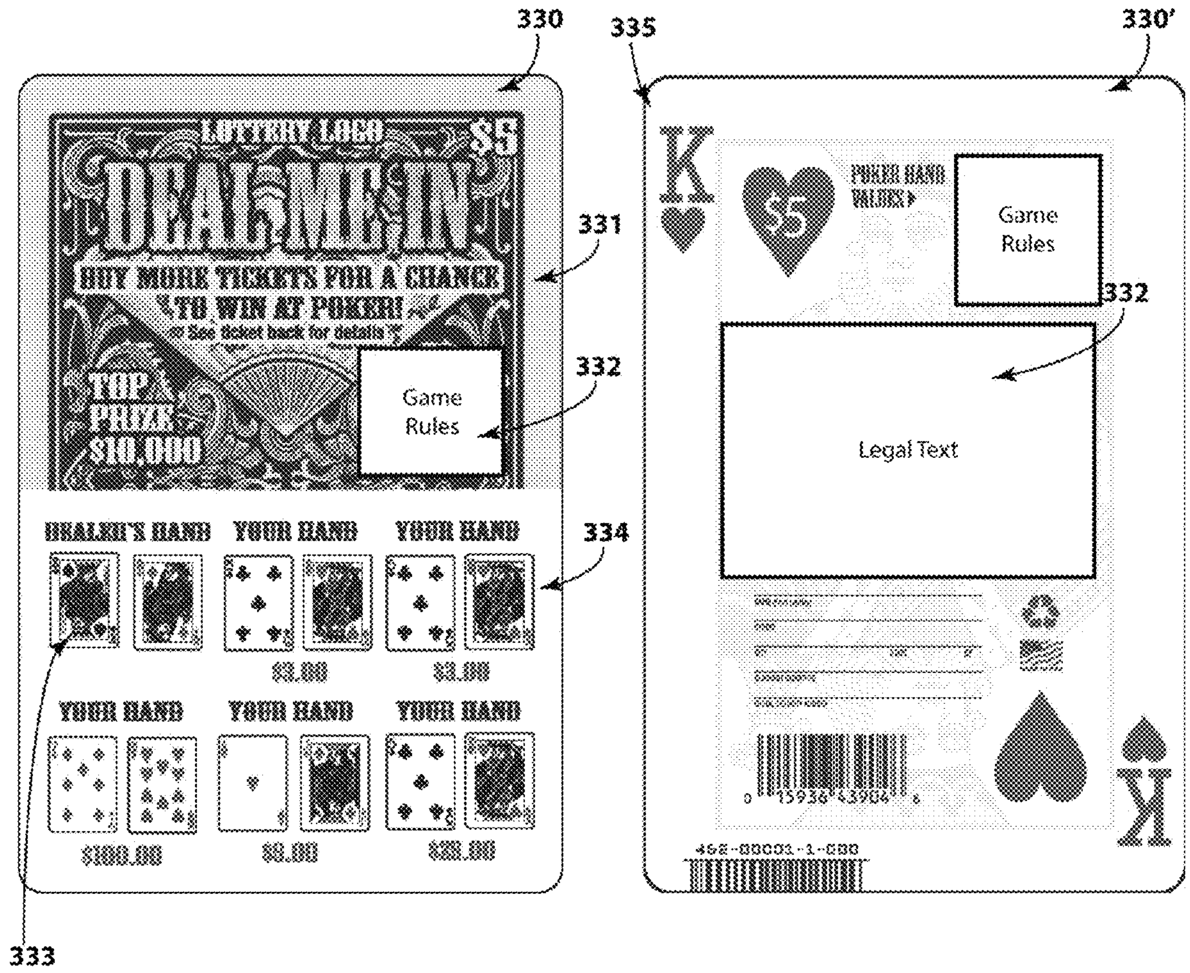
FIG. 3C is a second alternative representative example providing front and rear elevation views of a lottery instant ticket of the present disclosure where the display and the indicia portions as well as the ticket back were digitally imaged by high resolution process color digital imagers with the back portion including an additional collectable game.

While similar in structure to the exemplary one dimensional embodiment 220 of FIG. 2B, FIG. 2C provides an alternative exemplary multidimensional Game Database 236 embodiment 235 capable of supporting more complex tickets or plays (e.g., 136 and 136' of FIG. 1C, 300 and 301 of FIG. 3A, 310 and 310' of FIG. 3B, 330 and 330' of FIG. 3C). Like the previous one dimensional Game Database 221 structure (FIG. 2B), the exemplary multidimensional Game Database 236 structure of FIG. 2C can be divided into Game Rules 238 and Game Art 239 portions. For brevity, the Game Rules 238 portion is not explicitly broken out into its elements in the example of FIG. 2C, though it should be understood that similar elements (such as prize table 222 and rules 230 portions as shown in FIG. 2B) are included in the Game Rules 238 portion example of FIG. 2C.

The Game Art 239 portion of the multidimensional Game Database 236 though incudes additional elements other than the standard game play variable indicia (including captions) 240. As explained in the Game Art 239 portion detail, the game play variable indicia elements 240 are more intricate than the traditional variable indicia elements (e.g., 224 of FIG. 2B). This is to exploit the capabilities of the higher resolution process color imagers recently employed by the lottery instant ticket industry. In addition to higher resolution and full color capabilities, these new process color imagers are also capable of printing the entire front and/or back of instant tickets—e.g., 130 and 130' of FIG. 1C. As such, the multidimensional Game Database 236 (FIG. 2C) Gen system 235 in various embodiments also maintains Game Art 239 elements for both the front 241 and the back 242 display portions of the lottery instant ticket in addition to the game play variable indicia elements. Thus, in this example, the multidimensional Game Database 236 Gen system 235 becomes responsible for most or all lottery instant ticket art viewed by the consumer in addition to traditional game play variable indicia.

In various embodiments, the Game Database 236 becomes multidimensional for these types of lottery instant tickets (e.g., 136 and 136' of FIG. 1C, 300 and 301 of FIG. 3A, 310 and 310' of FIG. 3B, 330 and 330' of FIG. 3C) to support the (non-game play) display portion elements as well as the game play variable indicia. The multidimensional Game Database 236 (FIG. 2C) game Gen system 235 becomes "cognizant" of other portions of the lottery instant ticket display such that it can coordinate game play with these other portions. For example, as illustrated in FIG. 2C, the Game Art 239 portion of the multidimensional Game Database 236 includes four different ticket front display elements 241 as well as four different coordinating (i.e., themed to front) ticket back display elements 242. This synchronization between coordinating ticket front display 241 and back display elements 242 can readily be achieved with a two dimensional database structure where the coordinating ticket front 241 and back 242 display elements are paired on one axis (e.g., Y-axis) of the database with the other ticket elements represented on the other axis (e.g., X-axis) of the database. Furthermore, the Game Database 236 can include Game Rules 238 controlling the distribution of the front 241 and back 242 display pair elements in a book. In certain examples, no front and back display pair elements can be repeated within three tickets, and/or every book starts with a specific pair. Additionally, it can also be desirable to include the front 241 and back 242 display pair elements into the game play logic that necessitates another added dimension. For example, to mitigate the possibility that one particular front and back display pair (which would be visible to a consumer on unsold or unscratched tickets) are perceived as a "lucky" indicator or tell, it can be desirable to include a rule element in the Game Rules portion 238 of the Game Database 236 that ensures that no one display pair can have winning indicia configurations in excess of, for example, (a) one standard deviation from the mean average of the other display pairs; (b) a predetermined quantity; (c) a predetermined quantity based on the quantity of lottery tickets; or (d) an otherwise suitably determined quantity.

Returning to the exemplary embodiment 235 of FIG. 2C, the multidimensional Game Database 236 is then accessed by the deterministic Game Gen Process 206" where the variable indica 240, front display 241, and back display 242 elements are copied from the Game Art 224 portion and arranged as a homogeneous lottery instant ticket with the variable indicia configured in varying winning and non-winning arrangements for each lottery ticket in the game. The arrangement of variable indica 240, front display 241, and back display 242 elements on the lottery ticket are partially determined by the Game Rules 238 portion of the database and mainly driven by the Genesis Seed received from the TRNG generator 212". The various selected elements (e.g., variable indica 240, front display 241, and back display 242) are "flattened" into digital embodiments of the front and back of the ticket 243 for printing by the front and back process color imagers 244 with each fully imaged ticket 130" front play portion (i.e., game play variable indicia portion) subsequently covered with various SOC layers applied by static printing plates 245. Thus, the multidimensional Game Database 236 is utilized to print both the display and game play portions of the lottery instant ticket as part of the Ticket Imaging 237 process.

This is not to infer that multidimensional Game Databases 236 are only used to coordinate non-gaming and gaming portions of lottery instant tickets separately. The extraction of various elements from the extra dimensions of a database can also be employed to resolve the vexing problems associated with traditional game Gen systems creating a one dimensional array where a ticket's winning status is determined by both non-secure portions (i.e., not covered by SOC, visible when the ticket is in an unsold or pristine condition) and secure portions (i.e., covered by a SOC on unsold tickets).

For example, a known one dimensional Gen system was utilized to produce the previously discussed errant OLG "Super Bingo" instant lottery game that produced visually tells indicating winning tickets by observing patterns on each ticket's non-secure Bingo card variable indicia—see FIG. 1G. The known game Gen system was utilized to create a one dimensional array listing the prize values for each ticket with external processes repeated called to provide the needed additional functionality to create non-secure Bingo cards. As previously discussed, this unintended "tells" problem with the OLG "Super Bingo" game arose because the added dimension of Bingo card processing was not an integral part of the game Gen process, but rather incorporated by supplemental external processes that only received the prize value (if any) for each ticket in the game. This repeated calling of additional processing to automatically generate call numbers and associated Bingo cards based on the predetermined prize value unintentionally created a venue for unforeseen correlations and similarities to emerge between the clearly visible Bingo cards and the intended hidden prize value.

With the employment of the multidimensional database centric Gen system of the present disclosure, the possibility of unforeseen correlations and/or similarities between the visible Bingo cards and the actual prize value can be safely eliminated. As shown in FIG. 2D, the Game generation System 251 extracts the Game Rules 253 and game art 254 from the database 250 to produce tickets in a one dimensional output array 252 stored in the Ticket Image File 258 for a pending Bingo game to be printed. However, in this embodiment, the database's game art 254 includes a large set (e.g., ten thousand, one hundred thousand) of pre-generated Bingo cards 259 with accompanying call numbers 260 for every possible value in the game. By employing a database 250 with pre-generated Bingo cards 259 and correlated call numbers 260 for the added dimension's functionality, there can be no correlation between the visible Bingo cards and any value assigned to the printed ticket. In other words, the value of the ticket and how the Bingo cards were generated are completely independent of each other since every set of Bingo cards includes a corresponding set of call numbers for every possible ticket value, thus there can be no correlation between the visible Bingo cards and the hidden assigned ticket value. This embodiment of maintaining isolation via a database with a plurality of all possible outcomes between any visible display art on unsold tickets and the ticket's value assignment provides one methodology to guard against unexpected correlations or predictability when increasing the quantity of dimensions for any random or pseudorandom prize distribution.

Returning to FIG. 2D, while the database centric Game Generation System 251 does ultimately create a One Dimensional Output Array 252 for storage in a Ticket Image File 258, this One Dimensional Output Array 252 represents the final printed output of both the secure and non-secure portions of the tickets rather than a preamble of assigned secure one dimensional values that are subsequently processed to create the associated added dimensional non-secure portions (as previously done). For example, in FIG. 2D the first three tickets (255 thru 257) of the pending print run are shown coupled with linked extracted database art elements creating the secure (255" thru 257") and non-secure (255' thru 257') portions of each ticket. With the first and third tickets (255 and 257), the extracted secure Call Numbers (255" and 257") and non-secure Bingo Cards (255' and 257') portions would have been selected from the database to represent non-winning (i.e., zero value) tickets. But, with the second ticket 256 in the array 252, the extracted secure Call Numbers 256" and non-secure Bingo Cards 256' portions would have been selected to represent a $10 winning ticket with no subsequent processing (other than printing) required.

The advantages of a multidimensional database centric game Gen system can be further extended to resolve the problems associated with coordinating an instant ticket's variable non-secure plate printed display with a one dimensional game array (e.g., Lotto Quebec "Ble D'or" game) assuming a full color imager is coupled to the database centric game Gen system. For example, FIG. 2E illustrates how the problems associated with the ill-fated "Ble D'or" game would be resolved with one embodiment of the present disclosure. As before, the Game Generation System 276 extracts the Game Rules 278 and game art 279 from the database 275 to produce tickets in a one dimensional output array 277 stored in the Ticket Image File 283 for a revised "B le D'or" game to be printed. However, in this embodiment, the database's game art 279 includes the set of all variable displays (284 thru 287) or scenes for the "Ble D'or" game. Thus, while the specific embodiment of FIG. 2E does create a One Dimensional Output Array 277 for storage in Ticket Image File 283, this One Dimensional Output Array 277 represents the final printed output of both the secure and non-secure scene portions of the tickets rather than only containing the secure portions with the non-secure scene portions being plate printed (as previously done). For example, in FIG. 2E the first three tickets (280 thru 282) of the pending print run are shown coupled with linked extracted database art elements creating the secure and non-secure (280' thru 282') scene portions of each ticket.

This is not to imply that the multidimensional database centric game Gen system provided by the present disclosure can be only applied to known game styles. The database centric game Gen system can also be employed to enable new game styles that heretofore have not been possible.

For example, FIG. 3A illustrates two example lottery instant tickets 300 and 301 printed by higher resolution process color imagers that are similar to FIG. 1C. With lottery instant ticket 300 shown in FIG. 3A, instructions 302 are included in which revealing a dragon indicum 303 (wherein a magnified view of the instructions and dragon indicum are provided in 302' and 303', respectively) functions as a "doubler." Thus, the dragon indicum printed in the secure area 304 (i.e., covered by SOC when ticket is unsold or unplayed) would have a prize value of "$60" instead of the "$30" shown since the dragon indicum 304 is a "doubler" for the exemplary ticket 300. The dragon indicum 303 is selected as a "doubler" for ticket 300 to essentially theme a play feature (dragon indicum 304) with the display portion (i.e., the portion of the ticket that is not covered by SOC in an unsold or unplayed state) of the same ticket 300, since a dragon 308 is prominently featured in the ticket's 300 display portion although, ticket's 301 display portion prominently features a knight 309. Accordingly, ticket's 301 "doubler" is a knight's helmet indicum 306 as explained by the instructions 305 (magnified view of the knight's helmet indicum and instructions provided in 305' and 306', respectively). Consequently, the knight's helmet indicum printed in the secure area 307 would have a prize value of "$200" instead of the "$100" shown since the knight's helmet indicum 307 is a "doubler" for the exemplary ticket 301 with the dragon indicum 304' not having any "doubler" status on ticket 301 due to the difference in theming. Thus, the multidimensional Game Database 236 (FIG. 2C) associated with the production of lottery instant tickets 300 and 301 (FIG. 3A) would include at least one extra dimension to track concordance between the theming of the display and secure variable indicia "doubler" feature.

Another example of a multidimensional Game Databases 236 (FIG. 2C) used to control play of a predetermined game is provided with the three dimensional appearing crossword lottery instant ticket game 310 and 310' illustrated in FIG. 3B. Two perspectives of the same ticket (i.e., one pristine or unplayed perspective 310 and one played or completely scratched perspective 310') are provided in FIG. 3B. As shown in FIG. 3B, the crossword game is configured such that the game seems to be played on three dimensional appearing cubes 311/311'. Thus, the non-secure variable indicia 313/313' (i.e., non-secure variable indicia changes from ticket-to-ticket and are part of the game play, but are visible on an unplayed or unscratched ticket like 310) are overlaid askew onto the three dimensional appearing cubic background 311/311' such that the non-secure variable indicia 313/313' appear to be printed on the cubes' 311/311' surfaces. The SOC 312 (in three places) conceals the secure variable indicia 312' on the unplayed ticket 310 providing matching "your letters." Accordingly, if the display portion 311/311' varies from ticket-to-ticket (e.g., tickets 300 and 301 of FIG. 3A) with the arrangements of the three dimensional appearing cubes 311/311' differing, the skew of the corresponding overlaid non-secure variable indicia 313/313 can also vary. Therefore, in the example of FIG. 3B, the associated multidimensional Game Databases 236 (FIG. 2C) generating the tickets would not only include data for the variable indicia and the display portions but would necessitate at least another data set (dimension) in the database to specify how to skew the chosen non-secure variable indicia

313/313' (FIG. 3B) to match each corresponding display portion 311/311' background three dimensional appearing cube arrangement.

Figure 3D:
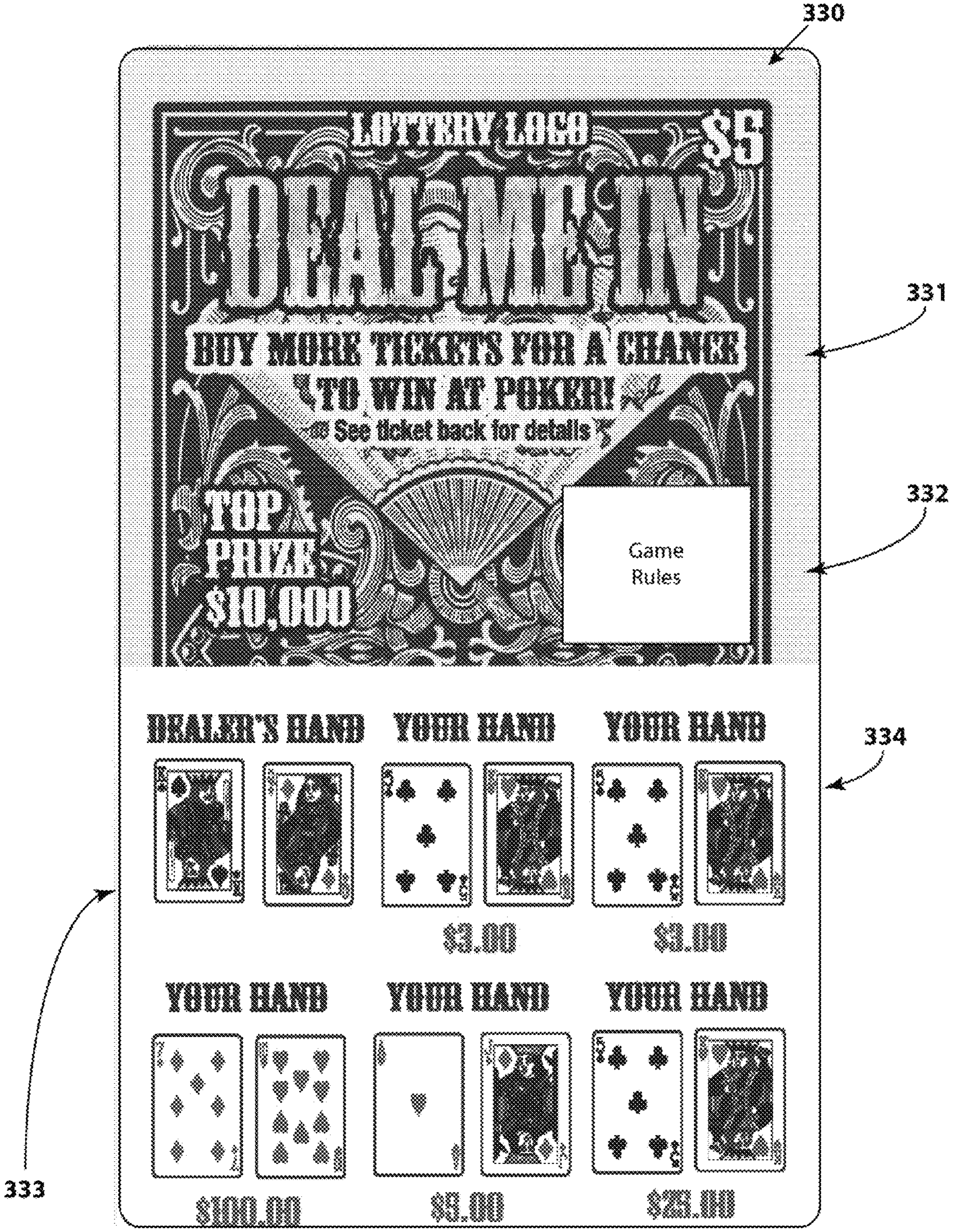
FIG. 3D is a magnified view of a first portion of the lottery ticket of FIG. 3C.
Figure 3E:
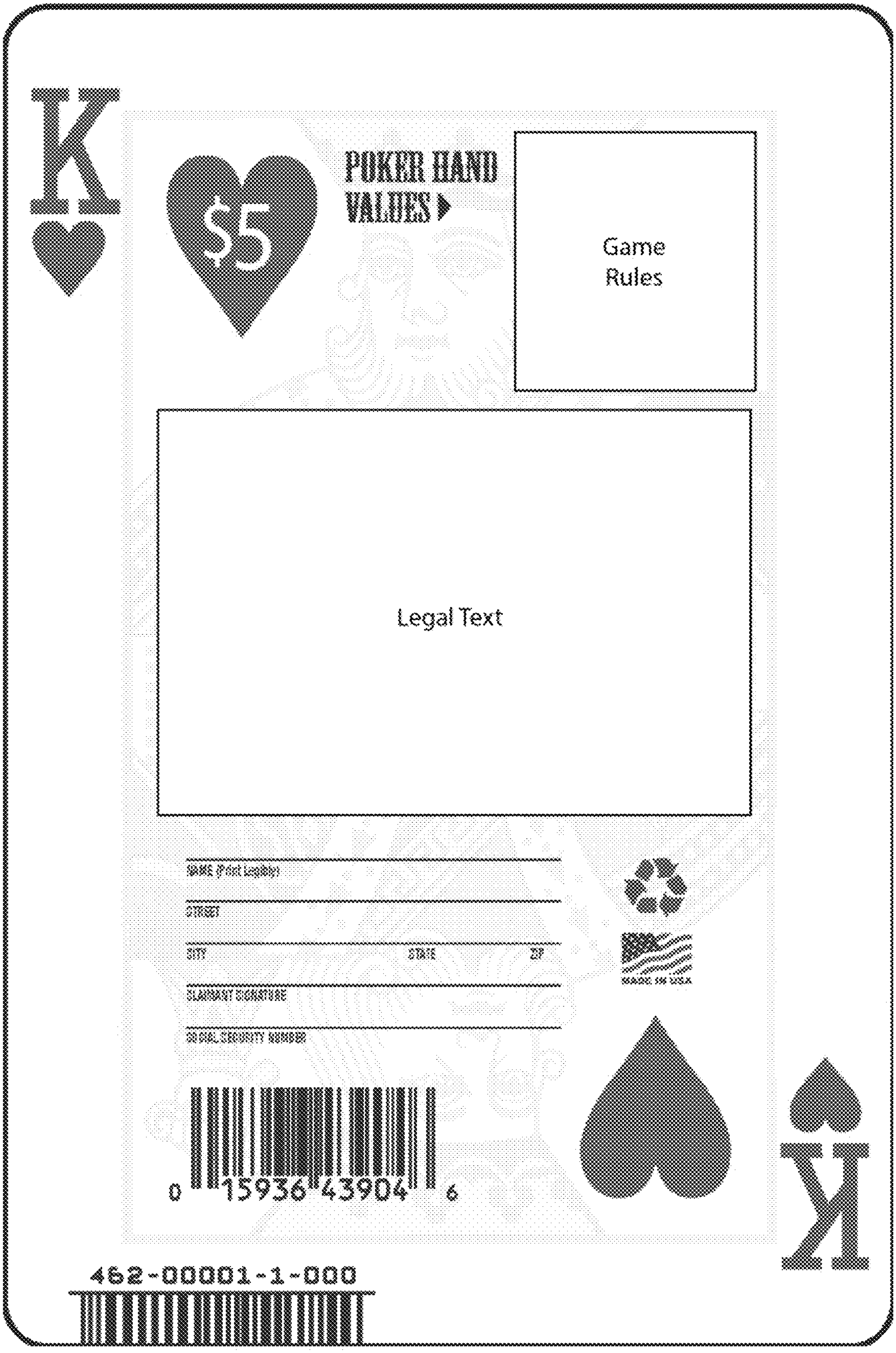
FIG. 3E is a magnified view of a second portion of the lottery ticket of FIG. 3C.

An example of a multidimensional Game Databases 236 (FIG. 2C) used to control play of both a predetermined game and an adjunct probability based collection game is provided 330 and 330' in FIG. 3C. Magnified views of the predetermined game 330 and probability 330' portions are provided in FIGS. 3D and 3E, respectively. In this example, the lottery instant ticket 330 (front) and 330' (back) are configured to offer a standard predetermined Blackjack style lottery instant game on the front 330 with selected secure variable indicia 333 "Dealer's Hand" and 334 "Your Hand" (shown in fully played or completely scratched state in 330) with its own discrete rules 332. Additionally, the back of the same ticket 330' features a separate probability based collector's probability poker themed game with its own instructions 331 where each ticket back 330' is imaged as a specific card 335 with a collection of five card backs constituting the collector's poker hand in the second probability game. The collector game is probability based (rather than predetermined) with the probabilities determined by the quantity of each playing card printed (e.g., there may be only one card printed that completes a Royal Flush). Thus, in this example, the associated multidimensional Game Databases 236 (FIG. 2C) generating the tickets would not only include at least one data array for the traditional predetermined game, it would also include at least one separate array (dimension) for the probability collector adjunct game 332 and 335 (FIG. 3C).

In these examples, the multiple requirements of the ticket or play construction and game play are readily accommodated by adding arrays or dimensions to the Game Databases 236 (FIG. 2C) to enable it to essentially track each separate function or dimension. These flexible multidimensional types of ticket or play construction would be extremely difficult if not impossible to implement with the known methodology of predetermined game generation—such as by creating a starting array organized of winning and losing tickets or plays and then shuffle or mix the one dimensional array to achieve a pseudorandom ergodic distribution.

Figure 3F:
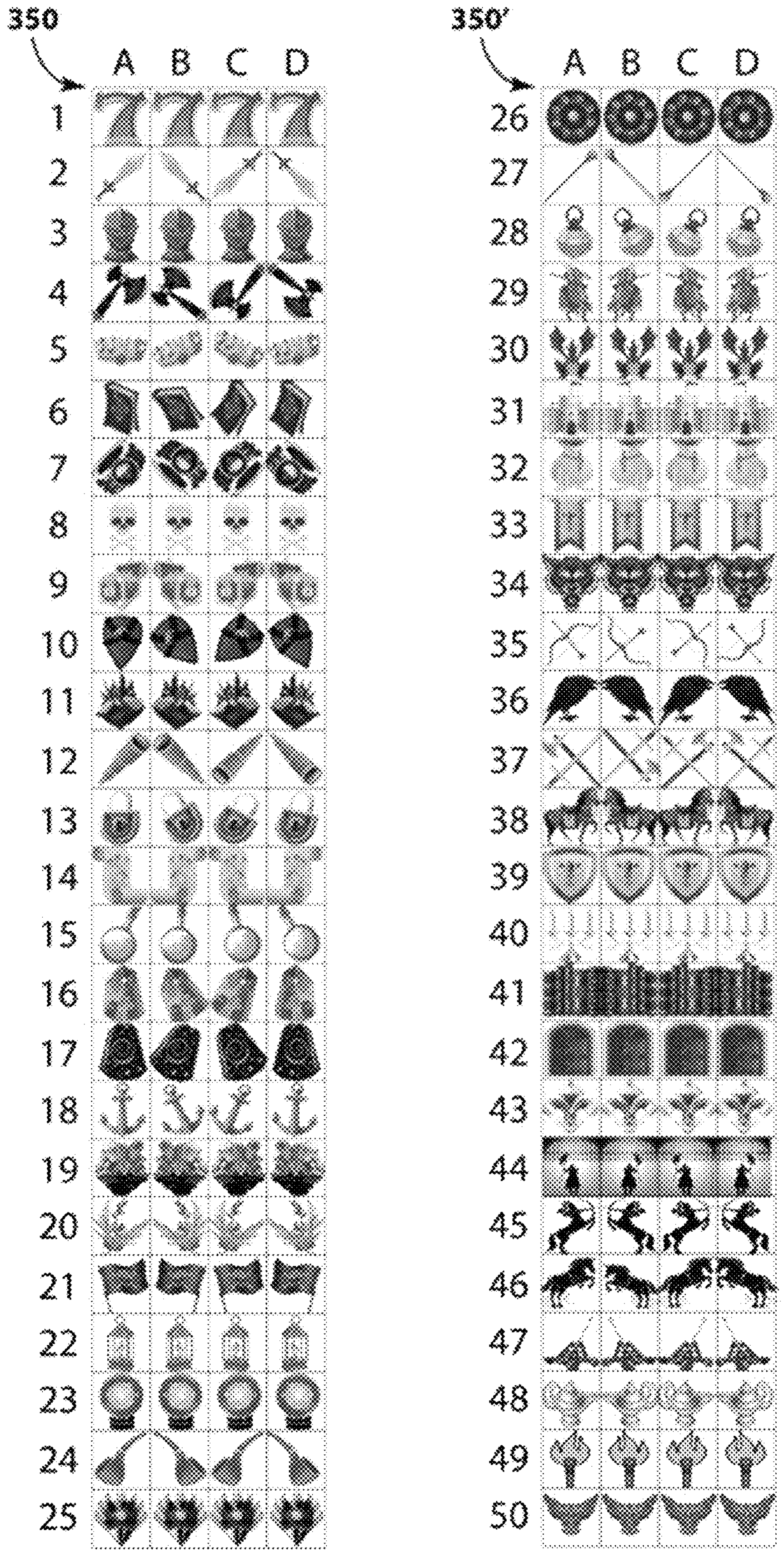
FIG. 3F is a representative example of a two dimensional database matrix of variable indicia of the present disclosure and supporting optional rotation to increase Shannon entropy on SOC protected documents thereby enhancing security against pinpricking.

In addition to enabling different types of ticket displays and game play, the multidimensional Game Databases 236 can also be utilized to increase the security and integrity of the game. For example, FIG. 3F illustrates a two dimensional game database construction with fifty different indicia in two columns 350 and 350'. The two columns are arranged with four different possible rotational and/or mirror perspectives of the same indicium. In this example, rows 1 and 3 illustrate indicium ("7" and "knight's helmet", respectively) with no rotation between the four cells "A" thru "D" while rows 2 and 4 illustrate indicum ("sword" and "battle axe", respectively) with informational rotational isotropy such that the indicum can be rotated 90° from its previous orientation as it progresses through the four cells "A" thru "D". This two dimensional matrix 350/350' could therefore become a portion of a multidimensional Game Databases 236 (FIG. 2C) for game generation, thereby enabling a database to identify which indicium exhibit some form of informational rotational and/or mirror isotropy (e.g., row 12 with 90° rotations between the four cells "A" thru "D" and row 9 with vertical mirroring duplicated twice between the four cells "A" thru "D") and which indicum exhibit no isotropy (e.g., rows 1, 3, 8, and 30 thru 34).

This ability to list rotational and/or mirror isotropy in a multidimensional Game Databases 236 (FIG. 2C) is significant since it creates a potential new countermeasure to the illicit problem of pinpricking unsold lottery instant tickets—i.e., inserting small holes through the SOC such that the holes would not be readily identifiable by an unsuspecting legitimate ticket consumer purchasing an "unplayed" ticket, but are large enough to enable a nefarious person to identify indicium under microscopic inspection. One known countermeasure against pinpricking is to "float" each variable indicum (i.e., each variable indicum can be positioned in a different portion over a limited area on the X/Y two dimensional substrate) to increase its position Shannon entropy and consequently increase the difficulty for any nefarious person attempting to pick out indicium by pinpricking. By adding the possibility of indicium rotation and/or mirroring to this known indicum float, the informational Shannon entropy of the indicum increases exponentially from the perspective of the nefarious person attempting to pinprick the SOC secured lottery instant ticket. Again, this type of rotational and/or mirroring pinpricking countermeasure could not be implemented readily with the known one dimensional array paradigm since not all indicum exhibit rotational and/or mirroring isotropy (e.g., rows 1, 3, 26, 30 thru 34, and 39 thru 43 of FIG. 3F).

Figure 3G:
FIG. 3G are elevation views of the backs of representative example lottery instant tickets of the present disclosure where the back digital imaging portrays two different coupons of differing value.

In addition to different types of ticket displays, game play, and security enhancements, the multidimensional Game Databases 236 (FIG. 2C) can also be employed to distribute non-gaming value enhancements to lottery instant tickets. For example, FIG. 3G illustrates two different lottery instant ticket backs 375 and 376 displaying different value added coupons offering the consumer potentially additional value other than the prize fund itself. the values of the coupons of the two different exemplary lottery instant tickets 375 and 376 can be perceived differently by some consumers. In other words, ticket 375 offers buy one get 50% off of any additional purchase while ticket 376 only offers 20% off of the purchase of a tote bag. Thus, it can be desirable to distribute ancillary value added elements (e.g., coupons) on lottery instant tickets with predefined constraints (e.g., no book will have more than one copy of coupon X, the calculated ancillary value of each book's added elements may not differ by plus-or-minus "±" $10) while still appearing pseudo-randomly distributed—i.e., not predictable where a given ancillary value added element will appear in a given book. By adding, in various embodiments, two more dimensions to the game database (such as one dimension for the ancillary value added elements and one dimensional for the dispersion rules) achieves ergodic distributions that can be in compliance with the distribution rules for ancillary value added elements. It should also be noted especially if the ancillary value added elements are visible on unpurchased or unplayed lottery instant tickets (e.g., printed on the ticket backs without any SOC overprint as shown in FIG. 3G), for security purposes, the distribution of the ancillary value added elements can be performed independent of the selection and arrangement of winning and losing variable indicia to ensure that no "tells" as to the prize value (if any) of the lottery instant ticket are inadvertently created.

While the previous database centric Gen system description focused on instant lottery tickets, the same system can be employed for other forms of predetermined games. For example, the database centric Gen system 200 embodiment can also be applied to the generation of predetermined pull-tab games, Class II ITVM games, Internet gaming, etc.

Figure 4:
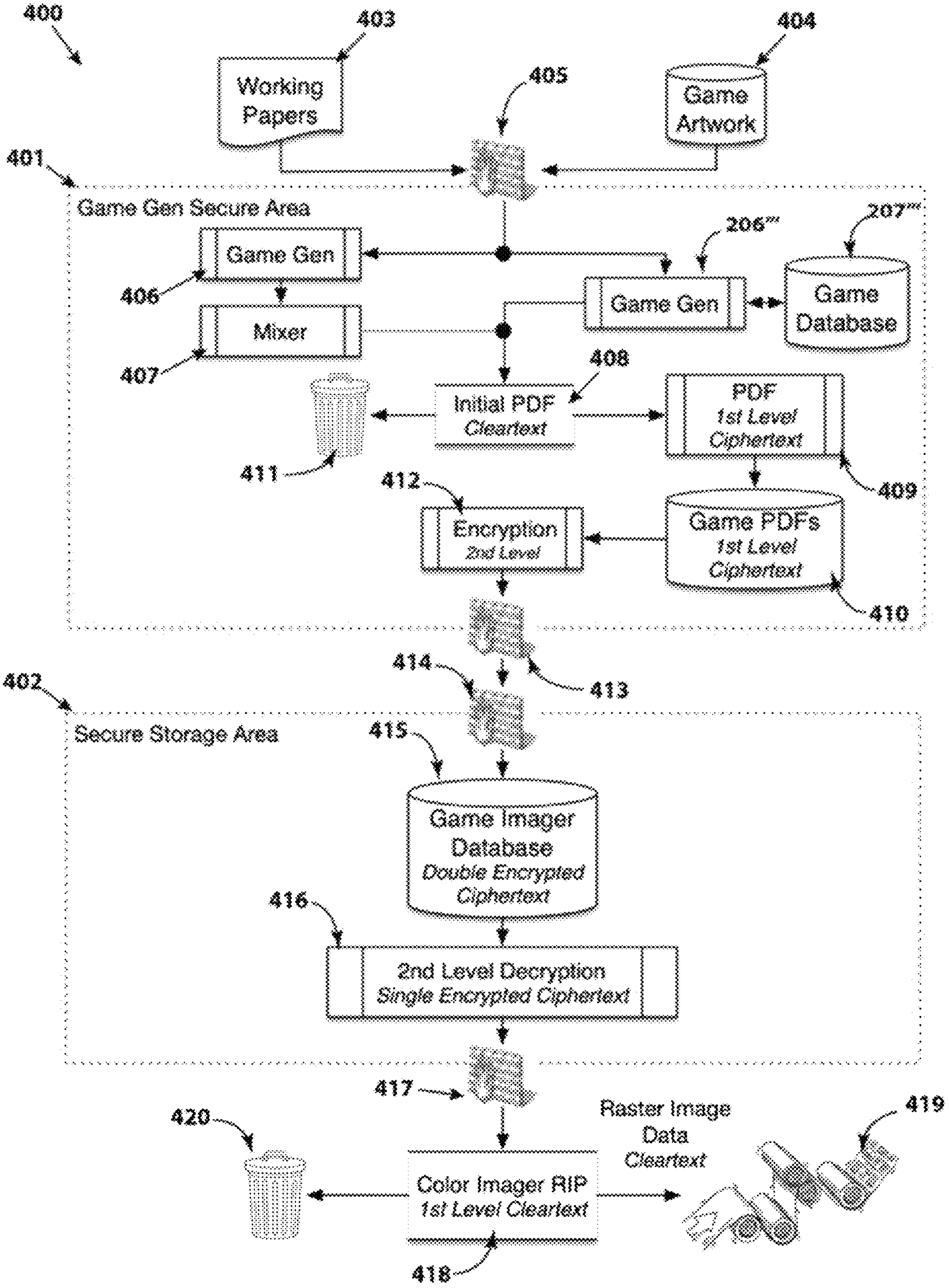
FIG. 4 is an overall diagram representative example providing a schematic graphical overview of an example embodiment of a system of the present disclosure for creating digitally imaged lottery instant tickets in widely available formats in a secure manner.

FIG. 4 is an overall diagram representative example 400 of a schematic graphical overview of an example embodiment of a system for creating lottery instant tickets in a commonly available format (e.g., Portable Data Format or "PDF", Encapsulated Postscript or "EPS", Portable Network Graphics or "PNG", Ink Jet Printer Data Stream or "IJPDS") in a secure manner for both an one dimensional mixer or shuffle (e.g., FIG. 1F) or database centric game Gen systems (e.g., FIG. 2A). FIG. 4 is primarily divided into two functional areas (i.e., Game Gen Secure Area 401 and Secure Storage Area 402) with each area representing a real world physical region in the process. If a particular flowchart function appears completely within an area, its functionality is limited to the data category of the associated area—e.g., the Initial PDF Cleartext 408 generation function resides exclusively within the Game Gen Secure Area 401.

Similar to before, the disclosed embodiment 400 of FIG. 4 begins with outside entities providing the Working Papers specification 403 as well as the Game Art elements 404 for a predetermined game such as via a firewall interface 405 to the Game Gen Secure Area 401. At this point FIG. 4 is divided into two divergent threads, one thread (406 and 407) where the Game Gen 406 applies the one dimensional Mixer 407 algorithm and with the second thread (206''' and 207''') representing the disclosed database 207''' centric game Gen 206''' system. Whichever thread is employed for creating lottery instant tickets in a commonly available format, the two divergent threads converge to create an initial standard formatted image file (PDF as illustrated in the example 400 of FIG. 4) in cleartext 408 that is maintained only in volatile memory (e.g., Random Access Memory or "RAM") and consequently is very short lasting in nature. Each newly generated standard formatted image file 408 is then is immediately encrypted by a first level encryption process 409 resulting in a ciphertext standard formatted image file 410 that is then saved to non-volatile memory—e.g., a database maintained by a hard drive. As soon as the ciphertext standard formatted image file 410 is saved into the database, the volatile memory maintaining the cleartext version is deallocated 411, resulting in the complete destruction of the cleartext standard formatted image file 408 information in this embodiment.

After all of the encrypted ciphertext standard formatted image files 410 necessary for the production of a game have been saved as ciphertext into non-volatile memory 410 within the Game Gen Secure Area 401, the encrypted image files 410 are transferred (such as via two firewalls 413 and 414) to a Secure Storage Area 402 Game Imager Database 415 after undergoing a second level of encryption 412. This double encryption is employed in various embodiments because the second level of encryption provides backward compatibility and (as will be shown) the newly added first level of encryption with a separate key enables the standard formatted image files 415 to both rest and be transmitted exclusively as ciphertext.

When the produced game is ready to print on press, the associated Raster Image Processor or "RIP" 418 first authenticates itself with the Secure Storage Area's 402 firewall 417 thereby gaining access to the ciphertext standard files 415 to be printed. As each double encrypted standard file is pulled from the Secure Storage Area's 402 database 415 and sent to the authenticated RIP 418, the second level encryption is decrypted 416 resulting in ciphertext files still encrypted with the first level of encryption—i.e., identical to the ciphertext files initially saved 410 in the Game Gen Secure Area 401. Finally, as the first level encrypted files are loaded into the RIP's 418 volatile memory, they are decrypted, resulting in cleartext image files that can be processed for printing tickets 419. In a process similar to the initial creation of the standard files, as soon as each cleartext file is rasterized to image tickets, the allocated RIP 418 volatile memory is released 420, again resulting in the complete destruction of the cleartext standard formatted image file. Alternatively, the first level decryption could be performed by a process external to the RIP (not shown in FIG. 4) with the resulting cleartext image files pushed to the RIP.

Figure 5A:
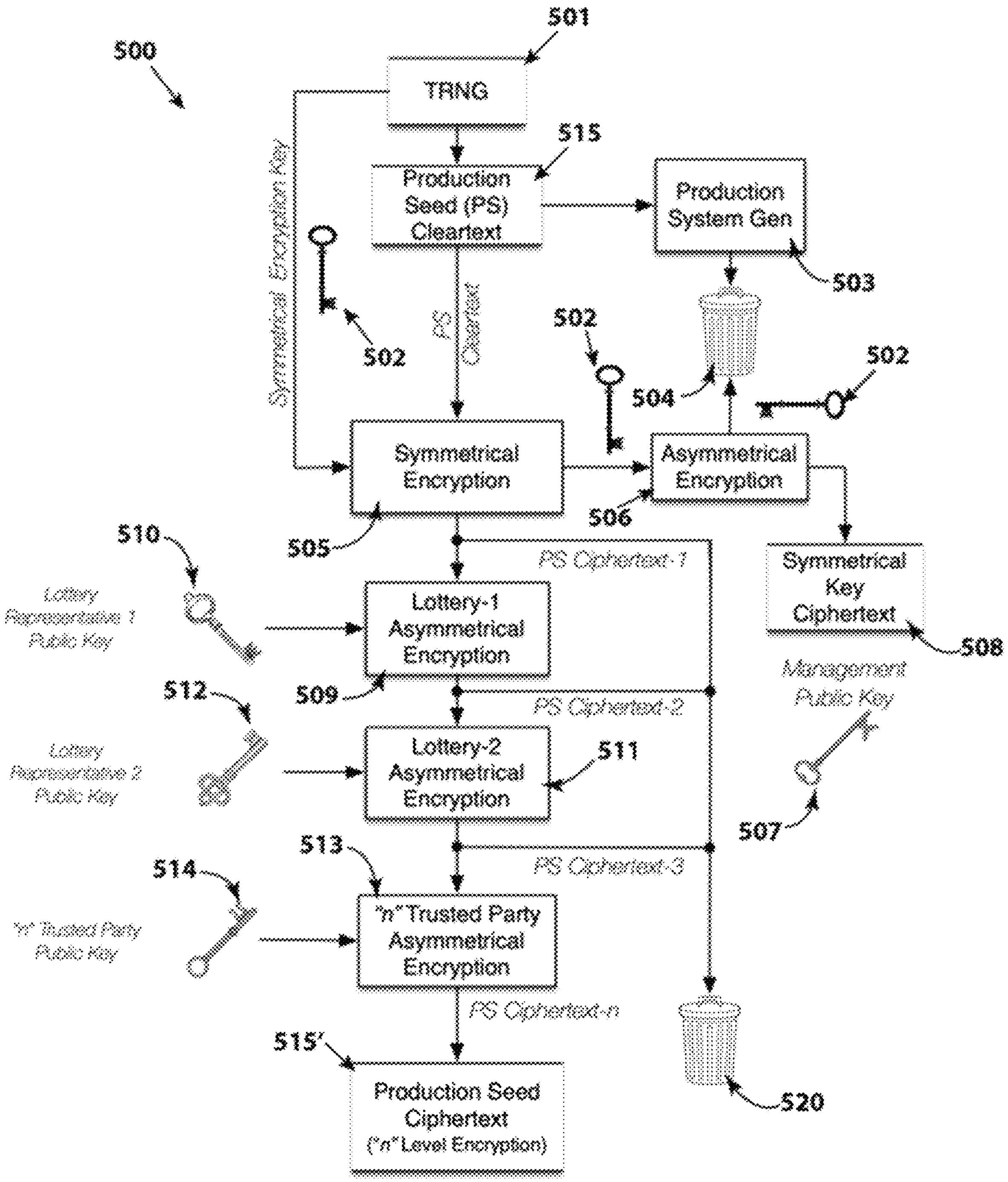
FIG. 5A is an overall diagram representative example providing a schematic graphical overview of an example embodiment of a system of the present disclosure for encrypting the game Gen production Genesis Seed(s) in a secure manner.
Figure 5B:
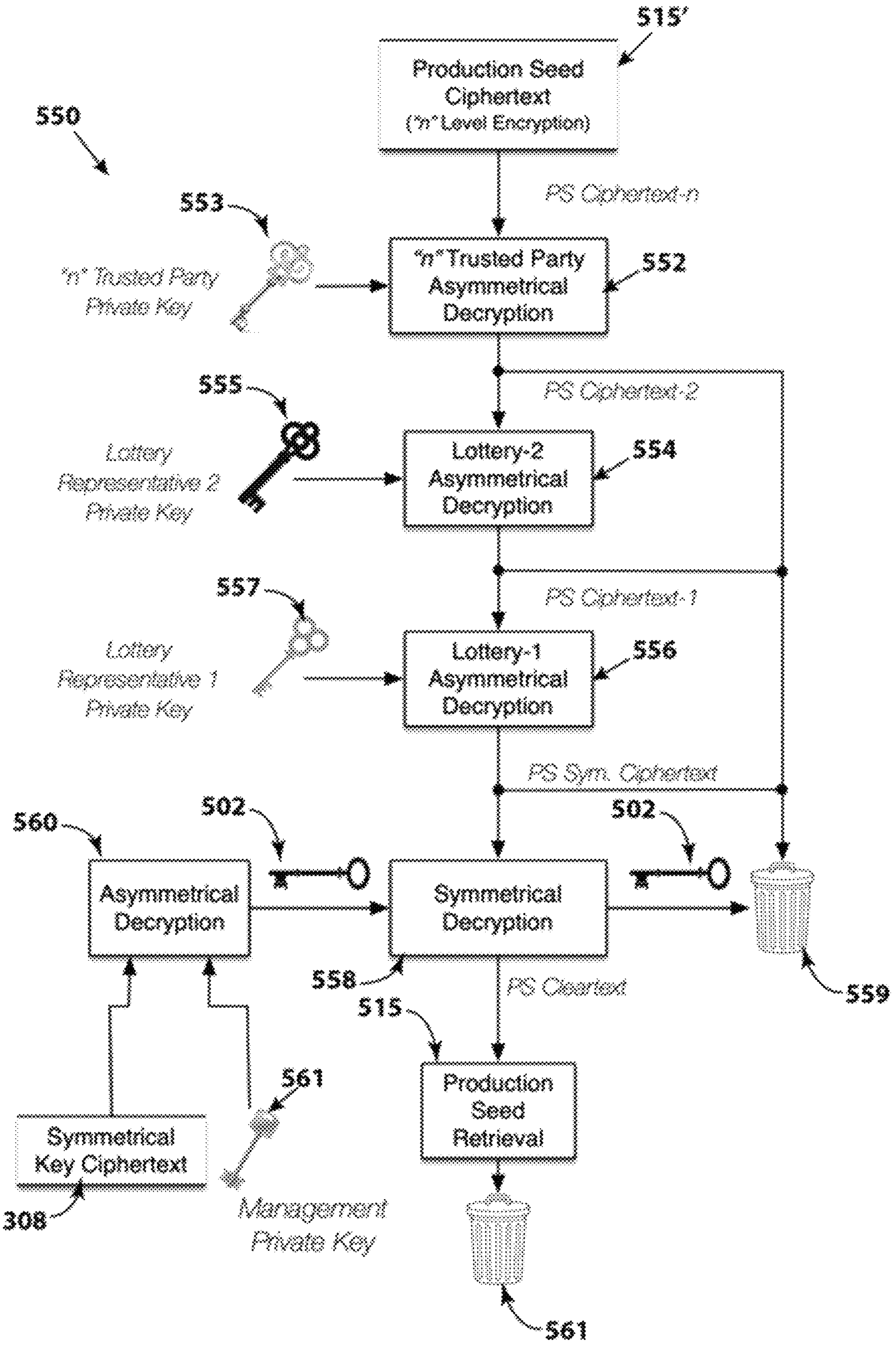
FIG. 5B is an overall diagram representative example providing a schematic graphical overview of an example embodiment of a system of the present disclosure for decrypting the ciphertext game Gen production Genesis Seed(s) of FIG. 5A in a secure manner.

FIGS. 5A and 5B taken together, provide detailed example embodiments of the disclosed database centric game Gen system securing the Genesis Seed(s) and/or Mixer seed(s) that were used to generate predetermined games for future use (e.g., ticket reconstructions). FIG. 5A is an overall block diagram representative example 500 of a n stage encryption process for securing the Genesis Seed(s) and/or Mixer seed(s) for future use as multilevel encrypted ciphertext. FIG. 5B is a block diagram representative example providing a schematic graphical overview of the secure decryption 550 of the multilevel encrypted ciphertext Genesis Seed(s) and/or Mixer seed(s) created in FIG. 5A.

The FIG. 5A exemplary embodiment 500 starts with a cleartext version of the Genesis Seed(s) 515 for a specific Game Database 207 (FIG. 2A) that was/were provided to the Game Gen Process 206 to construct a game from the Game Database 207 elements. As previously discussed, the Game Gen Process 206 provides a deterministic machine algorithm in which there is only one possible (ergodic) arrangement of the given Game Database 207 elements for the game being produced that is determined by the Genesis Seed(s) used to create the game.

Returning to FIG. 5A, the cleartext Genesis Seed(s) 515, generated by a TRNG 501, that was/were used for the production of a game with the database centric game Gen system is/are first Symmetrically Encrypted 505 with an onetime use unique key 502 generated by the TRNG 501 for this specific purpose. For this foundation level of encryption, a Symmetrical Encryption algorithm 505 with an uniquely generated TRNG Symmetrical Encryption Key 502 is employed in various embodiments. A suitable standard Symmetrical Encryption algorithm 505 can be used for this purpose (e.g., Advanced Encryption Standard or "AES", Blowfish). An One Time Pad or "OTP" Symmetrical Encryption algorithm 505 can be employed in various embodiments assuming the TRNG 501 was used to generate the Symmetrical Encryption Key 502 with the encryption key 502 including the same quantity of bits as the cleartext Genesis Seed(s) 515. Whichever standard is employed for the Symmetrical Encryption 505 algorithm, the cleartext production Genesis Seed(s) embodiment 515 is/are destroyed 504 after being used to generate the production game 503 assuming the symmetrical encrypted ciphertext embodiment of the same Genesis Seed(s) was also created 505.

The one time use Symmetrical Encryption Key 502 is then itself encrypted with an Asymmetrical Encryption algorithm 506 (e.g., Rivest-Shamir-Adleman or "RSA", Elliptic Curve Cryptography or "ECC") using a manager's public key 507 (e.g., some trusted individual not directly involved in the production process) to generate a ciphertext embodiment of the Symmetrical Encryption Key 508 that is securely stored, such as in a location inaccessible by the manager that provided the public key 507. The surviving cleartext embodiment of the Symmetrical Encryption Key 502 is then destroyed 504 leaving no cleartext copies of either the Genesis Seed(s) 515 or the Symmetrical Encryption Key 502 used to encrypt the Genesis Seed(s) 515.

At this point the n series of subsequent asymmetrical encryptions begin. The asymmetrical public keys (e.g., 510, 512, and 514) of various n dissimilar parties each are employed to sequentially encrypt the various embodiments of multilevel encrypted ciphertext (509, 511, and 513) of the Genesis Seed(s) 515 such that the resulting Production Seed Ciphertext 515' has been encrypted multiple times so that no one "trusted" individual and private key (not shown in FIG. 5A) can reproduce the cleartext embodiment of the Genesis Seed(s) 515. Additionally, after each stage of the n series of asymmetrical encryption occurs, the various surviving intermediatory ciphertext embodiments are destroyed 520 immediately after being re-encrypted by the next asymmetrical encryption process in the series resulting in a new embodiment of ciphertext at each stage. This process continues until the $n^{th}$ embodiment of ciphertext is generated (515' in FIG. 5A), which is then archived with the game database for possible future reconstructions. Thus, only if all n parties approve of a reconstruction of the game 503 by decrypting their corresponding embodiment of ciphertext will the cleartext version of the Genesis Seed(s) 515 ultimately be available.

For example, FIG. 5A shows two different public keys (510 and 512) issued by lottery representatives used as part of the n series asymmetrical encryption process (509 and 511, respectively). In this particular example, one lottery representative 510 can be designated "requestor" with the second lottery representative 512 designated "authorizer" thereby describing their roles in requesting a regeneration process. As also shown in the FIG. 5A example, the n party public key 514 applied to the associate asymmetrical encryption 513 process is performed on the ciphertext previously produced by the second Lottery Representative's public key 512 and asymmetrical encryption process 511. In this example, the n party can be an auditor or other personnel that would be required to first decrypt the final embodiment of Production Seed Ciphertext 515' before the other parties can participate. Although there are three levels of asymmetrical encryption illustrated in FIG. 5A, it should be understood that any practical quantity of n asymmetrical encryption levels can be applied with the intermediary ciphertext embodiments destroyed as soon as they are re-encrypted.

While the previous n stage encryption process 500 focused on securing Genesis Seed(s) for future use as multilevel encrypted ciphertext, the same system can be employed for other forms of predetermined game generation. For example, the n stage encryption process 500 can also be applied to generated Shuffle or Mixer seed(s).

FIG. 5B provides a representative example of the secure decryption 550 process for the multilevel encrypted ciphertext game production Genesis Seed(s) and/or Mixer seed(s) that were created in FIG. 5A. Therefore, FIG. 5B starts with the n level encrypted Genesis Seed Production Seed Ciphertext 515' that was ultimately created in FIG. 5A essentially reversing the previous encryption processes. This ciphertext 515' is first decrypted with the $n^{th}$ Trusted Party's Private Key 553 using the same type of asymmetrical algorithm 552 that was originally employed to produce the n Production Seed Ciphertext 515' in FIG. 5A, only now in decryption mode. The resultant one lower level encrypted production seed ciphertext (i.e., "PS Ciphertext-2" in FIG. 5B) is then passed to "Lottery Representative 2" who then decrypts the incoming "PS Ciphertext-2" embodiment with their private key 555 using an asymmetrical algorithm 554. In the example of FIG. 5B, this layered asymmetrical decryption process is repeated one more time by "Lottery Representative 1" using private key 557 and asymmetrical decryption algorithm 556 with the output symmetrically encrypted ciphertext embodiment ("PS Sym. Ciphertext") being the lowest level of encryption for the production Genesis Seed. This lowest level "PS Sym. Ciphertext" version is then decrypted 558 using the symmetrical key 502 that was recovered by decrypting 560 the Symmetrical Key Ciphertext 308 using the "Management" private key 561. After decryption 558, the symmetrical key 502 is destroyed 559 with the reproduced Production Seed 515 applied to the database for the authorized reconstruction and then ultimately destroyed 561.

In this embodiment, each step of the layered asymmetrical decryption process requires access to each trusted party's private key. Thus, in order to keep each trusted party's private key "private", each step in the decryption process will, in various embodiment, occur at each trusted party's own secure location run on their own trusted computing platform with the varying levels of ciphertext embodiments being passed to/from each trusted party as soon as it becomes available. This was not the case for the multilevel encryption process of FIG. 5A since only the n trusted parties' public keys were required for layered asymmetrical encryption. By definition, each of the n trusted parties' public keys are "public" and could therefore all be physically amassed at the game Gen facility without any security compromises to the trusted entities. More to the point, each level intermediary ciphertext production seed embodiment was assuredly deleted 520 after re-encryption. This deletion 520 of each level intermediary ciphertext production seed embodiment cryptographically isolates each trusted party in the asymmetrical encryption layers, thereby preventing a subset of trusted parties (e.g., Lottery Representative 1 and Management) colluding together to nefariously recreate the production seed.

However, this assured destruction of intermediary ciphertext embodiments is not possible in the multilevel asymmetrical decryption process (550 of FIG. 5B), since in order to keep trusted party private keys "private" it is necessary to transmit each level of the production Genesis Seed ciphertext embodiment to the appropriate trusted party for decryption in their own trusted environment (552, 554, and 556). Theoretically, this creates a potential (albeit small) opportunity for collusion amongst the "trusted" parties where unauthorized reconstructions can be possible after the first authorized reconstruction. Fortunately, there are several methods to mitigate this admittedly small potential security threat. For example, the lowest level (i.e., foundation) of the multilevel encryption process is a symmetrical encryption algorithm with the related trusted party (Management in FIG. 5B) only asymmetrically encrypting and decrypting 560 the symmetrical key 502 that was used to encrypt the production Genesis Seed and not the production Genesis Seed itself. Therefore, only the cleartext symmetrical key 502 would be visible to trusted "Management" during decryption with the lowest level ciphertext production Genesis Seed embodiment remaining inaccessible to trusted "Management". Alternatively, this theoretical security problem can be mitigated by creating a new symmetrical key 502 after every authorized reconstruction resulting in a different embodiment of the first level Production Seed Ciphertext 515' generated. Instead, or in addition to, like the lowest level "Management" asymmetrical encryption 506 (FIG. 5A) and decryption 560 (FIG. 5B) process, each trusted party could asymmetrically encrypt separate (for each level) symmetrical encryption keys used for each level of the multilevel production seed ciphertext. The last alternative embodiment has the advantage of higher security with the disadvantage of greater complexity.

While the previous n stage decryption process 550 focused on decrypting Genesis Seed(s) for use from multilevel encrypted ciphertext, the same system can be employed for other forms of predetermined game generation. For example, the n stage decryption process 550 can also be applied to ciphertext seeds created for a Shuffle or Mixer.

Figure 6A:
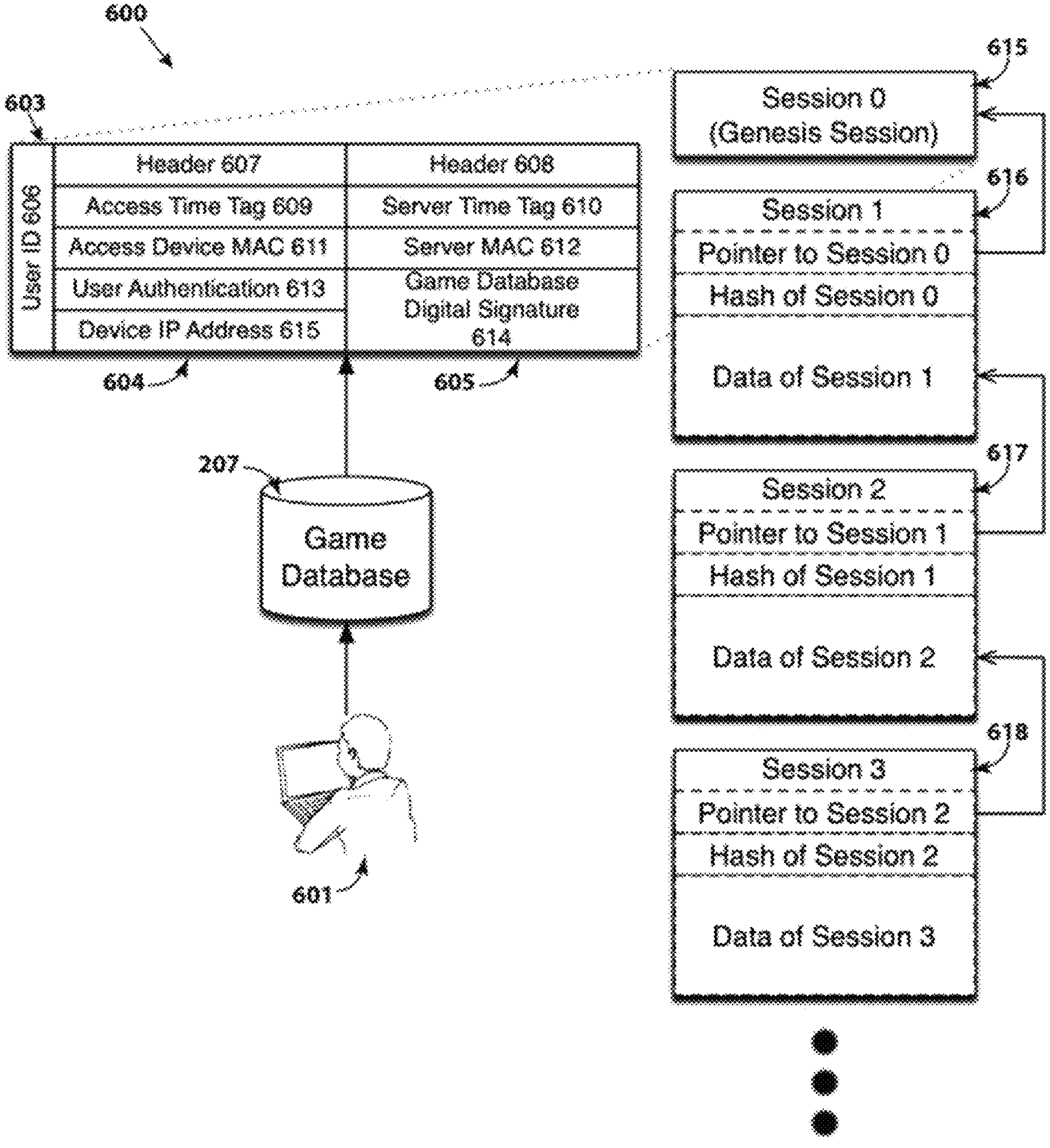
FIG. 6A is a representative example of a possible structure of a blockchain embodiment of the game database of FIGS. 2A thru 2C.
Figure 6B:
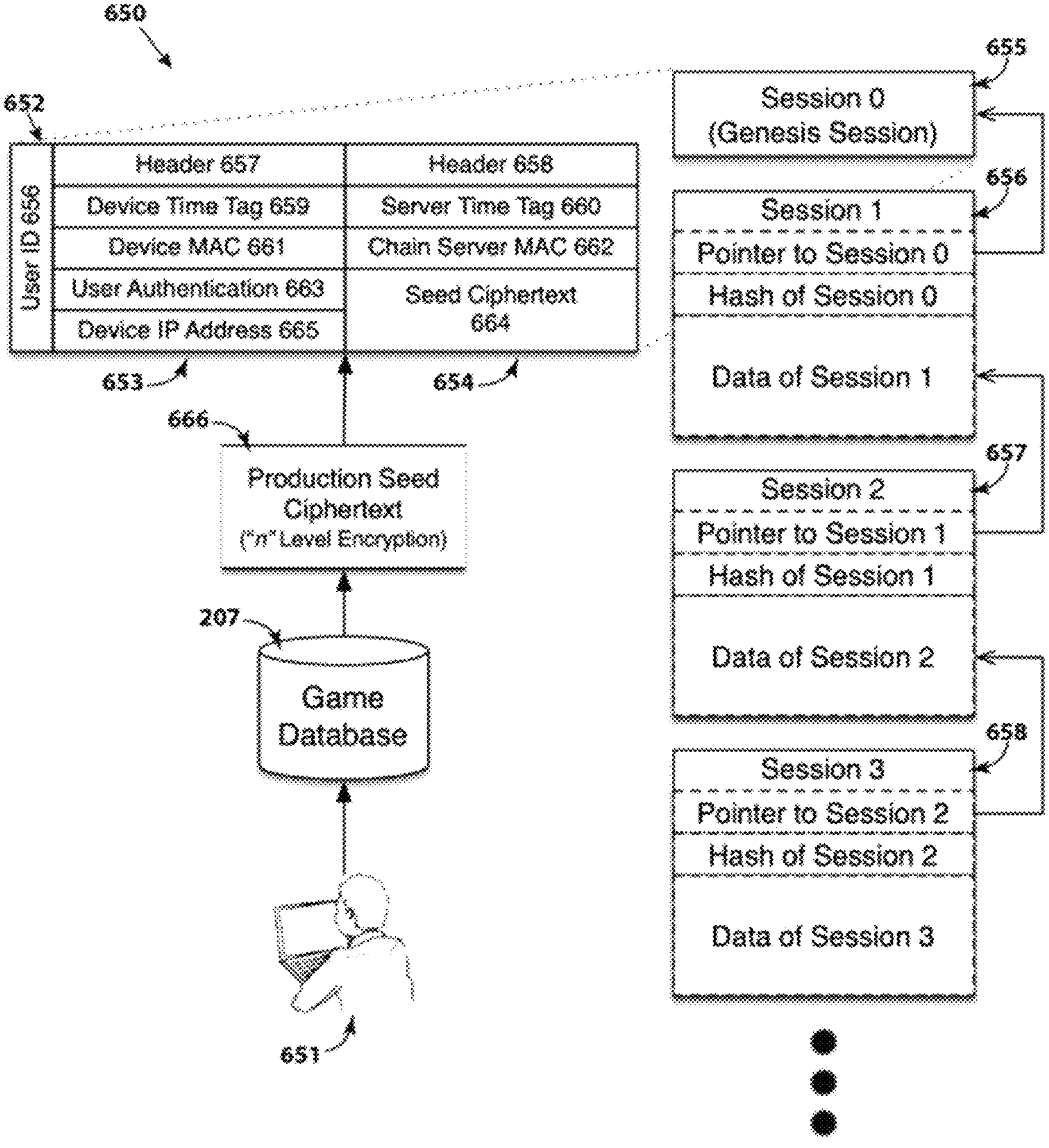
FIG. 6B is a representative example of a possible structure of a blockchain embodiment of the Genesis Seed(s) of FIGS. 2A thru 2C.

FIGS. 6A and 6B taken together, provide representative examples of possible structures of blockchain embodiments of the disclosed database centric game Gen system game database as well as the Genesis Seed(s). FIG. 6A is an overall block diagram representative example of providing a forensic blockchain audit trail of each game database every time the Game Database is accessed. FIG. 6B is a block diagram representative example of the multilevel encrypted ciphertext Genesis Seed(s) and/or Shuffler or Mixer seed(s) embodiments created in FIG. 5A.

As previously disclosed, each game created by the disclosed game Gen system includes its own specific database (e.g., 221 of FIG. 2B and 236 of FIG. 2C) that is accessed for development, production, and (optionally) reconstruction of each game. Hence, the history of the disclosed database centric game Gen system creation and maintenance of a given game database can be construed by maintaining a forensic record of the database for each game. Additionally, it is theoretically impossible to reconstruct a game without the associated game database and the accompanying production Genesis Seed(s). Therefore, maintaining a log of every time a given game database was accessed or altered would essentially provide an audit structure for the entire life of each game as well as provide a conclusive history for security and troubleshooting purposes. By encapsulating this audit structure into a hash chain or blockchain the resulting forensic audit not only becomes complete but also unalterable.

FIG. 6A provides a representative example of optionally linking every access or change to a given game's database to part of a hash chain or blockchain 600. In the example of FIG. 6A, every time an user 601 accesses the Game Database 207 a session 603 is created. In this example, each session 603 includes three different categories of data containing: (1) user 601 authentication information 603, (2) user's computing platform authentication information 604, and (3) the Game Database's 207 configuration 605 at the time of the access. Additionally, each session 603 can be sorted by: (a) the ID 606 of the user 601 accessing the Game Database 207 at a given time 609, (b) the user's 601 computing device 611 accessing the Game Database 207 at a given time 609, and (c) the configuration of the Game Database 207 itself 614 at a given time 610. Each session's 603 structure is also arranged such that the user's 601 computing device and the Game Database 207 portions are partitioned in their own discrete columns or silos (604 and 605, respectively) with separate, but related unique Headers 607 and 608 automatically generated by the hash chain or blockchain server for each column (604 and 605), thereby enabling identification of each session 603 of user 601 and device authentication 640 as well as the game database 605 data. Time Tags (609 and 610) as well as user computing device and game database server Media Access Control or "Mac" addresses (611 and 612, respectively) are also provided in each column (604 and 605) enabling the option of separate and discrete tracking of the user's 601 computing device 604 and the accessed game database 605. Finally, the Internet Protocol or "IP" address 615 of the user's 601 computing device when this session 603 is in progress along with a Digital Signature 614 of the Game Database 207 is also maintained.

In the example of FIG. 6A, each session 603 can be optionally saved into a hash chain 615 with the very first (root) session for a given Game Database 207 becoming "Session 0" or the "Genesis Session". The next subsequent session 616 would include a pointer to the previous (Genesis Session) as well as a cryptographic hash (e.g., Secure Hash Algorithm at 256-bits or "SHA-256") of the previous session 615 in the hash chain or blockchain as well as its own session data. This hash chain or blockchain process will continue as subsequent sessions (617 and 618) occur for the same Game Database 207 with each session essentially linked to all previous sessions in a manner such that no historical data can be altered without disturbing the integrity of the hash chain or blockchain. Thus, by maintaining the disclosed session 603 structure in a hash chain or blockchain its historical integrity is assured and becomes therefore suitable for forensic audits of the high integrity typically required of the gambling or gaming industry.

Since the hash chain or blockchains contain no sensitive data (such as no win or lose information of a particular ticket or play for a given game), the hash or blockchains can be freely duplicated and distributed whenever a new session is added. For example, the secure game Gen site and all n trusted parties can each maintain a copy of the hash chain or blockchain. If any discrepancy in the n number of parties holding copies of the blockchain is detected it can easily be resolved by all parties adopting the longest blockchain of record.

Similar to FIG. 6A, FIG. 6B provides a representative example of optionally linking every access or change to a given game's production Genesis Seed(s) to part of a hash chain or blockchain 650. In the example of FIG. 6B, every time an user 601 accesses the Production Seed Ciphertext 666 for a given Game Database 207 a session 652 is created. As before, each session 652 includes three different categories of data including: (1) user 651 authentication information 656, (2) user's computing platform authentication information 653, and (3) the Production Seed Ciphertext 666 configuration 654. Additionally, each session 652 can be sorted by: (a) the ID 656 of the user 651 accessing the Game Database 207 at a given time 609, (b)_the user's 601 computing device 611 accessing the Production Seed Ciphertext 666 for the Game Database 207 at a given time 659, and (c) the Production Seed Ciphertext 666 itself 664 at a given time 660. Each session's 652 structure is also arranged such that the user's 651 computing device and the Production Seed Ciphertext 666 portions are partitioned in their own discrete columns or silos (653 and 654, respectively) with separate, but related unique Headers 657 and 658 automatically generated by the hash chain or blockchain server for each column (653 and 654) thereby enabling identification of each set of user 651 and device authentication 653 and Production Seed Ciphertext 666 data. Time Tags (659 and 660) as well as user 651 computing device and the Production Seed Ciphertext 666 data server Mac addresses (661 and 662, respectively) are also provided in each column (653 and 654) enabling the option of separate and discrete tracking of the user's 651 computing device 653 and the accessed Production Seed Ciphertext 666. Finally, the IP address 665 of the user's 651 computing device when this session 652 is in progress is provided.

In the example of FIG. 6B, each session 652 can be optionally saved into a hash chain 655 with the very first (root) session for a given Production Seed Ciphertext 666 becoming "Session 0" or the "Genesis Session." The next subsequent session 656 would include a pointer to the previous (Genesis Session) as well as a cryptographic hash of the previous session 655 in the hash chain or blockchain as well as its own session data. This hash chain or blockchain process will continue as subsequent sessions (657 and 658) occur for the same Production Seed Ciphertext 666 with each session essentially linked to all previous sessions in a manner such that no historical data can be altered without disturbing the integrity of the hash chain or blockchain. Thus, by maintaining the disclosed session 652 structure in a hash chain or blockchain, its historical integrity is assured and becomes therefore suitable for forensic audits of the high integrity typically required of the gambling or gaming industry.

Since the hash chain or blockchains contain no sensitive data (such as no win or lose information of a particular ticket or play for a given game), the hash or blockchains can be freely duplicated and distributed whenever a new session is added. For example, the secure game Gen site and all n trusted parties can each maintain a copy of the hash chain or blockchain. If any discrepancy in the n number of parties holding copies of the blockchain is detected it can easily be resolved by all parties adopting the longest blockchain of record.

The hash chain or blockchains of FIGS. 6A and 6B are only two possible embodiments with other embodiments being conceivably more desirable under some circumstances. For example, the separate hash chain or blockchains depicted in FIGS. 6A and 6B can be combined into an overall blockchain for a given game. In this example, where the historical session data becomes a part of an overall hash chain or blockchain, the previously disclosed decrypting of levels of the Production Seed Ciphertext 666 by different entities could optionally be added. Alternatively, a hash chain can be created for and Shuffle or Mixer seed(s) developed in known previous embodiments.

Figure 7:
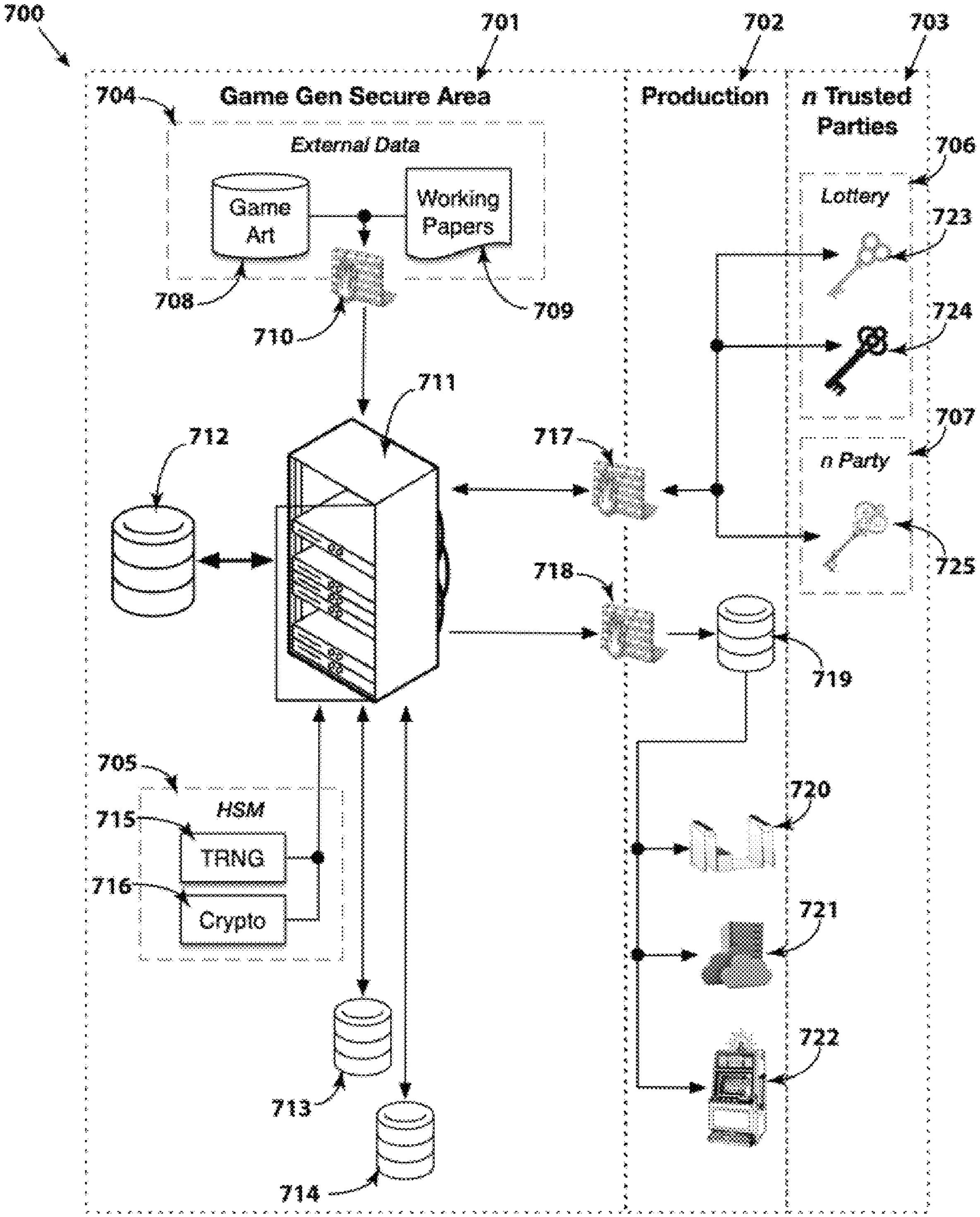
FIG. 7 is a representative example high level hardware architecture diagram of the certain components associated with the database centric game Gen system in accordance with one example embodiment of the present disclosure.

FIG. 7 illustrates an exemplary hardware architecture diagram 700 of the key components associated with the database centric game Gen system. In the exemplary hardware system diagram 700, various embodiments of the present disclosure are conceptually divided into three cognizant groupings (i.e., "Game Gen Secure Area" 701, "Production" 702, and "n Trusted Parties" 703) by the three columns as shown in FIG. 7. If a particular component appears completely within a column, its functionality is limited to the data category of the associated column—e.g., TRNG 715 is exclusively part of the Game Gen Secure Area column 701.

As shown in hardware architecture diagram 700, the process starts with the External Data 704 (i.e., data supplied from sources outside of the secure game gen physical area) of Game Art 708 and Working Papers 709 elements transferred through a secure interface (e.g., firewall 710) to the game Gen system server 711 and ultimately the particular game database 712 that was uniquely created for the pending game. At this point, the game Gen system server 711 generates and outputs to a separate file 713 which is a test development game for auditing. Separate non-volatile memory 713 for the test development game is employed in various embodiments, since the physically separate memory reduces game database 712 storage requirements as well as simplifies integration, testing, and auditing processes.

The only difference between the test development game and the actual production game is the Genesis Seed used to drive the arrangement and the distribution of tickets or plays for the predetermined game. In various embodiments, both the test development game and the actual production game Genesis Seeds are generated by the hardware TRNG component 715 housed in the Hardware Security Module (HSM) 705. The chosen test development game Genesis Seed is not considered sensitive data and can be therefore saved as cleartext in the game database 712, since its predetermined output 713 is used only for testing and auditing with its arrangement of variable indicia and order of plays not reflecting the actual game that will be placed on sale. The actual production game Genesis Seed is another matter, since this seed determines the winning and losing arrangement of variable indicia and tickets or plays in the predetermined game that will be placed on sale it should, in various embodiments, be generated by the TRNG 715 and not saved as cleartext. Consequently, the actual production game Genesis Seed is, in various embodiments, stored as multilevel encrypted ciphertext (e.g., callout 500 of FIG. 5A) in the game database 712 (FIG. 7) or optionally a separate non-volatile memory 714. In various embodiments, the multilevel encryption of the production game Genesis Seed is executed by the game Gen system server 711 partially utilizing n trusted party public keys that are stored as cleartext in either the game database 712 or a separate non-volatile memory 714. In various embodiments, the game Gen system server 711 utilize the high integrity cryptographic or "Crypto" functions 716 provided by the HSM 705 for the multilevel encryption of the production game Genesis Seed.

Once the test development game has been generated, tested, and successfully audited the actual production game is generated from a different Genesis Seed. Assuming the production game passes testing and a second audit, it is then transferred from the local game Gen working non-volatile memory embedded in the server 711 to secure production memory 719 typically via at least one security barrier (e.g., firewall 718). How the production memory 719 is accessed for actual game play will vary depending on the type of the predetermined game that was generated. For lottery instant tickets or pull-tabs, the production memory 719 will hold the predetermined game data until a print run. During the print run the production memory 719 will be accessed by the imager(s) 720 and digitally imaged on the lottery instant tickets or pull-tabs. For Internet gaming, the predetermined game can be transferred from production memory 719 to a cloud based server 721 for play by play dispersion over the Internet to various players. Finally, for Class II ITVMs 722 portions of the production memory 719 will be either downloaded or intermittently printed as machine readable embodiments to the various Class II ITVMs 722 for individual play reveals.

If predetermined game reconstructions are needed after the game is placed on sale, the associated multilevel encrypted ciphertext Genesis Seed will need to be decrypted. As disclosed in FIG. 5B, this decryption process is, in various embodiments, conducted at each trusted party's facility on their own trusted computing platforms. In the example 550 of FIG. 5B, this involves pushing various embodiments of the multilevel encrypted ciphertext of the actual production game Genesis Seed to the trusted party entities. As illustrated in FIG. 7, this involves transmitting the various levels of production game Genesis Seed ciphertext through at least one security barrier (e.g., firewall 717) to the trusted party's computing platforms 706 and 707. At each stage in the multilevel decryption process the appropriate trusted party will use their private key (723, 724, and 725) on their own trusted computing platforms to decrypt the incoming multilevel ciphertext of the production game Genesis Seed and once decrypted return the resulting lower level ciphertext to the game Gen system server 711.

If optional hash chain or blockchain embodiments are enabled, at least one copy of the hash chain or blockchain embodiment(s) is/are maintained in the local game Gen working non-volatile memory 714. Optionally in various embodiments, copies of the same hash chain or blockchain can be readily duplicated to any interested party. If any of the hash chain or blockchain copies veracity is challenged, then the longest (i.e., most data) hash chain or blockchain copy will be accepted and copied as the authentic version.

It should be appreciated from the above that various embodiments of the present disclosure provides a system for generating predetermined game outcomes including varying arrangements of indicia extracted from a game database of elements including (i) data representing a plurality of art indicia, and (ii) data representing rules for determining a dispersal of different winning and losing arrangements of predetermined game outcome indica. In various such embodiments, the system includes a processor and a memory device that stores a plurality of instructions, that when executed by the processor, cause the processor to access the game database of elements, and receive and use a Genesis Seed to generate an unique order and arrangement of selected predetermined game outcome indicia and related art indicia from the game database of elements. In various such embodiments, the game database of elements and the Genesis Seed enable only one possible arrangement of the selected predetermined game outcomes indicia based on the game database of elements and the Genesis Seed. In various such embodiments, the plurality of instructions, when executed by the processor, cause the selected predetermined game outcome indicia to be saved in non-volatile memory. In various such embodiments, the plurality of instructions, when executed by the processor, cause the processor to produce an one dimensional array containing a series of images with variable indicia arranged pseudo-randomly in winning and losing patterns that is saved in the non-volatile memory for printing. In various such embodiments, the plurality of instructions, when executed by the processor, cause the processor to produce an array containing a series of images with variable indicia arranged pseudo-randomly in winning and losing patterns coordinated with front and back display portions that is saved in the non-volatile memory for printing. In various such embodiments, the game database of elements further includes display art and wherein the plurality of instructions, when executed by the processor, cause the processor to use the Genesis Seed to generate an unique order and arrangement of selected display art from the game database of elements. In various such embodiments, the selected predetermined game outcome indicia are for a lottery instant ticket game. In various such embodiments, the selected predetermined game outcome indicia saved in the non-volatile memory is encrypted as ciphertext. In various such embodiments, the saved selected predetermined game outcome indicia is saved in a Portable Data Format (PDF) standard. In various such embodiments, the Genesis Seed is multilevel encrypted into ciphertext such that a plaintext version of the Genesis Seed can be destroyed after being used by the processor. In various such embodiments, a first level of multilevel encryption of the Genesis Seed includes a symmetrical encryption process. In various such embodiments, the plurality of instructions, when executed by the processor, cause the processor to cause a hash chain of the game database of elements to be incremented every time the game database of elements is accessed such that the hash chain includes: (i) user identification (ID) and authentication information of a person conducting a session that causes access to the game database of elements, (ii) Internet Protocol (IP) address of a device conducting the session, and (iii) a digital signature of the game database of elements to the hash chain when the session is initiated, such that the hash chain provides a record of every session the game database of elements was accessed. In various such embodiments, the plurality of instructions, when executed by the processor, cause the processor to cause the hash chain to be duplicated and distributed to multiple interested parties. In various such embodiments, the plurality of instructions, when executed by the processor, cause the processor to cause a Media Access Control (Mac) address of the device conducting the session to be recorded in the hash chain.

It should be appreciated from the above that in various embodiments, the present disclosure provides a system for generating a plurality of Scratch-Off-Coating (SOC) secured documents that each include substrate, variable indicia selected from a plurality of different variable indicia on the substrate, and an SOC covering the variable indicia on the substrate. In various such embodiments, the system includes a printer, a processor, and a memory device that stores a plurality of instructions, that when executed by the processor, cause the processor to: cause the printed variable indica to be printed on the substrates in pseudo-randomly determined different rotational positions on each substrate where the variable indicia exhibits rotational isotropy, and/or cause the printed variable indica to be printed on the substrates in pseudo-randomly determined different mirrored orientations where the variable indica exhibits mirrored isotropy, such that respective positions and/or orientations of the variable indica on the substrates reduce determination of the variable indicia though pinholes in SOCs covering the variable indica. In various such embodiments, the printed variable indica include process colors. In various such embodiments, four different pseudo-randomly determined rotation positions ninety degrees apart include a total range of rotation for the printed variable indica on the substrates.

It should be appreciated from the above that in various embodiments, the present disclosure provides a system for encrypting a predetermined game production Genesis Seed, wherein the system includes a processor and a memory device that stores a plurality of instructions, that when executed by the processor, cause the processor to perform a foundation level symmetrical encryption of the predetermined game production Genesis Seed using a symmetrical cryptographic key forming a foundation level ciphertext, and preform at least one subsequent level asymmetrical encryption process of the foundation level ciphertext using a different asymmetrical cryptographic key to create a multilevel encrypted ciphertext of the predetermined game production Genesis Seed encrypted by different encryption keys and processes, such that a resulting multi-level encrypted ciphertext is storable for use in future forensic game reconstruction with the predetermined game production Genesis Seed and the foundation level ciphertext destroyed. In various such embodiments, the plurality of instructions, when executed by the processor, cause the processor to cause a hash chain to be maintained of multi-level encrypted ciphertext. In various such embodiments, the foundation level symmetrical encryption includes a One Time Pad (OTP). In various such embodiments, the multi-level encrypted ciphertext is decryptable into cleartext by reversing a sequence of levels of encryptions using a private key for the subsequent level ciphertext portions and the symmetrical key for the foundation level ciphertext. In various such embodiments, the multilevel decryption of the multi-level encrypted ciphertext is recordable by a hash chain.

It should be appreciated from the above that various embodiments of the present disclosure provide a system for adding to a hash chain of a game database of elements for every session in which the game database of elements is accessed. In various such embodiments, the system includes a processor and a memory device that stores a plurality of instructions, that when executed by the processor, cause the processor to: increment the hash chain for each session that the game database of element is accessed by: (i) adding to the hash chain user identification (ID) and authentication information of a person conducting the session, (ii) adding to the hash chain Internet Protocol (IP) and Media Access Control (Mac) addresses of a device conducting the session, (iii) adding to the hash chain a time tag of when the session is initiated, and (iv) adding to the hash chain a digital signature of the game database of elements after the session is initiated, such that the hash chain provides a record of every session that accesses the game database of elements. In various such embodiments, the hash chain is duplicated and distributed to interested parties.

In various embodiments of the present disclosure, the Gen system server includes at least one processor. The at least one processor is a suitable processing device or set of processing devices, such as a microprocessor, a microcontroller-based platform, a suitable integrated circuit, or one or more Application-Specific Integrated Circuits (ASICs), configured to execute software enabling various configuration and reconfiguration tasks, such as: (1) communicating with a remote source (such as a server that stores authentication information or game information) via a communication interface of the Gen system server; (2) converting signals read by an interface to a format corresponding to that used by software or memory of the Gen system server; (3) accessing memory to configure or reconfigure parameters in the memory; (4) communicating with interfaces and the peripheral devices (such as input/output devices); and/or (5) controlling the peripheral devices.

The Gen system server also includes at least one memory device, which includes: (1) volatile memory (e.g., RAM, which can include non-volatile RAM, magnetic RAM, ferroelectric RAM, and any other suitable forms); (2) non-volatile memory (e.g., disk memory, Flash memory, Erasable Programmable Read-Only Memory or "EPROMs", Electrically Erasable Programmable Read-Only Memory or "EEPROMs," memristor-based non-volatile solid-state memory, etc.); (3) unalterable memory (e.g., Programmable Read-Only Memory or "PROMs"); (4) read-only memory; and/or (5) a secondary memory storage device, such as a non-volatile memory device, configured to store software related information. Any other suitable magnetic, optical, and/or semiconductor memory can operate in conjunction with the present disclosure. Any suitable combination of one or more computer readable media can be utilized. The computer readable media can be a computer readable signal medium or a computer readable storage medium. A computer readable storage medium can be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a Random Access Memory (RAM), a Read-Only Memory (ROM), an erasable programmable read-only memory (EPROM or Flash memory), an appropriate optical fiber with a repeater, an optical storage device, a magnetic storage device, or any suitable combination of the foregoing. In the context of the present disclosure, a computer readable storage medium can be any tangible medium that can contain, or store a program for use by or in connection with an instruction execution system, apparatus, or device.

Aspects of the present disclosure can be illustrated and described herein in any of a number of patentable classes or context including any new and useful process, machine, manufacture, or composition of matter, or any new and useful improvement thereof. Accordingly, aspects of the present disclosure can be implemented entirely hardware, entirely software (including firmware, resident software, micro-code, etc.) or combining software and hardware implementation that can all generally be referred to herein as a "circuit," "module," "component," or "system." Furthermore, aspects of the present disclosure can take the form of a computer program product embodied in one or more computer readable media having computer readable program code embodied thereon. Computer program code for carrying out operations for aspects of the present disclosure can be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions can also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions can also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It should be appreciated by those skilled in the art in view of this description that various modifications and variations can be made to the present disclosure without departing from the scope and spirit of the present disclosure. It is intended that the present disclosure include such modifications and variations as come within the scope of the appended claims.

What is claimed is:

1. A method for generating an instant lottery ticket, the method comprising:

providing a two-dimensional database storing a plurality of different art indicia in a first dimension of the database and a plurality of different copies of each of the plurality of different art indicia in a second dimension of the database;

using a Genesis Seed to:

(i) select one of the plurality of different art indicum from the first dimension of the database, and (ii) select one of the different copies of the selected first art indicium from the second dimension of the database;

repeating (i) and (ii) until a quantity of different copies of the selected art indicia are selected to provide variable art indicia required for an instant lottery ticket; and using the Genesis Seed to generate an unique arrangement of the selected copies of the selected art indicia to be printed on a substrate of the instant lottery ticket, wherein the combination of the database and the Genesis Seed can create only one possible arrangement of the selected copies of the selected art indicia, and causing the arranged art indicium to be saved in a non-volatile memory device.

2. The method of claim 1, wherein the different copies of at least one of the different art indicium in the second dimension of the database differ by their perspective rotational position.

3. The method of claim 1, wherein the different copies of at least one of the different art indicium in the second dimension of the database differ by their perspective mirrored orientation.

4. The method of claim 1, wherein a plurality of the different art indicia comprise different colors.

5. The method of claim 1, wherein a plurality of the different art indicia comprise different process colors.

6. The method of claim 1, which includes using the Genesis Seed to generate the unique arrangement of the selected copies of the selected art indicia to be printed on the substrate of the instant lottery ticket by high resolution process color imagers.

* * * * *